(12) United States Patent
Sakuramata

(10) Patent No.: US 9,529,457 B2
(45) Date of Patent: Dec. 27, 2016

(54) COORDINATES INPUT SYSTEM, COORDINATES INPUT APPARATUS, AND COORDINATES INPUT METHOD

(71) Applicant: Yoshifumi Sakuramata, Kanagawa (JP)

(72) Inventor: Yoshifumi Sakuramata, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 19 days.

(21) Appl. No.: 14/748,687

(22) Filed: Jun. 24, 2015

(65) Prior Publication Data

US 2015/0378457 A1    Dec. 31, 2015

(30) Foreign Application Priority Data

Jun. 26, 2014   (JP) .................................. 2014-130948

(51) Int. Cl.
| | |
|---|---|
| G06F 3/033 | (2013.01) |
| G06F 3/0354 | (2013.01) |
| G06F 3/038 | (2013.01) |
| G06F 3/044 | (2006.01) |

(52) U.S. Cl.
CPC ......... *G06F 3/03545* (2013.01); *G06F 3/0383* (2013.01); *G06F 3/044* (2013.01); *G06F 2203/0384* (2013.01)

(58) Field of Classification Search
CPC . G06F 3/03545; G06F 3/04883; G06F 3/0317
USPC ...................... 345/173–180; 178/18.01–18.04
See application file for complete search history.

(56) References Cited

U.S. PATENT DOCUMENTS

| | | | |
|---|---|---|---|
| 6,208,330 B1 * | 3/2001 | Hasegawa ............... | G06F 3/038 178/18.01 |
| 6,429,856 B1 | 8/2002 | Omura et al. | |
| 6,701,095 B1 | 3/2004 | Fujimoto et al. | |
| 6,950,613 B2 | 9/2005 | Fujimoto et al. | |
| 7,146,111 B2 | 12/2006 | Fujimoto et al. | |
| 7,336,282 B2 | 2/2008 | Kato et al. | |
| 7,436,393 B2 * | 10/2008 | Hong ...................... | G06F 3/045 178/18.01 |

(Continued)

FOREIGN PATENT DOCUMENTS

| | | |
|---|---|---|
| JP | 2000-105671 | 4/2000 |
| JP | 2005-165832 | 6/2005 |

(Continued)

*Primary Examiner* — Kimnhung Nguyen
(74) *Attorney, Agent, or Firm* — Oblon, McClelland, Maier & Neustadt, L.L.P.

(57) ABSTRACT

A coordinates input system includes a coordinates input apparatus and a pointing device. The coordinates input apparatus includes a detector detecting a voltage value of each intersection point between electrodes in an electrode part, and a determination part determining whether coordinates are input by the pointing device based on the detected voltage. The pointing device includes a switching part switching conductivity between a contact part and a gripper, and a controller switching the conductivity between the contact part and the gripper at a switching period longer than a detection period in the detector. The determination part determines whether the coordinates input into the electrode part are made by the pointing device based on a change in the voltage values of the intersection points within a time corresponding to the switching period.

12 Claims, 18 Drawing Sheets

(56) References Cited

U.S. PATENT DOCUMENTS

| | | | |
|---|---|---|---|
| 7,525,536 B2 * | 4/2009 | Kobayashi | G06F 3/03542 178/18.01 |
| 7,528,990 B2 | 5/2009 | Lu et al. | |
| 7,773,810 B2 | 8/2010 | Sakayori et al. | |
| 7,809,300 B2 | 10/2010 | Saeki et al. | |
| 7,889,405 B2 | 2/2011 | Takami et al. | |
| 7,899,246 B2 | 3/2011 | Kato et al. | |
| 8,040,579 B2 | 10/2011 | Nagahara et al. | |
| 8,068,251 B2 | 11/2011 | Sakuramata et al. | |
| 8,125,683 B2 | 2/2012 | Miyazawa et al. | |
| 8,159,506 B2 | 4/2012 | Yano et al. | |
| 8,411,290 B2 | 4/2013 | Lu et al. | |
| 8,438,478 B2 | 5/2013 | Takami et al. | |
| 8,482,539 B2 | 7/2013 | Ogawa et al. | |
| 8,635,527 B2 | 1/2014 | Saeki et al. | |
| 8,692,805 B2 | 4/2014 | Hashimoto | |
| 2006/0128468 A1 * | 6/2006 | Yoshikawa | A63F 13/10 463/36 |
| 2007/0070473 A1 | 3/2007 | Lu et al. | |
| 2007/0115491 A1 | 5/2007 | Kato et al. | |
| 2007/0133073 A1 | 6/2007 | Shida et al. | |
| 2007/0139741 A1 | 6/2007 | Takami et al. | |
| 2008/0291173 A1 * | 11/2008 | Suzuki | A63F 13/10 345/173 |
| 2011/0193777 A1 | 8/2011 | Zhou et al. | |
| 2012/0013555 A1 | 1/2012 | Maeda et al. | |
| 2013/0038551 A1 * | 2/2013 | Shirai | G06F 3/0416 345/173 |
| 2013/0300708 A1 * | 11/2013 | Kim | G06F 3/0416 345/174 |
| 2014/0035848 A1 * | 2/2014 | Rhee | G06F 3/03545 345/173 |
| 2015/0070299 A1 * | 3/2015 | Chae | G06F 3/044 345/174 |

FOREIGN PATENT DOCUMENTS

| | | |
|---|---|---|
| JP | 2008-176802 | 7/2008 |
| JP | 2011-134069 | 7/2011 |
| JP | 2011-145762 | 7/2011 |
| JP | 2011-522332 | 7/2011 |
| JP | 4857385 | 1/2012 |
| JP | 2012-022543 | 2/2012 |
| JP | 5366789 | 12/2013 |
| JP | 5377713 | 12/2013 |

* cited by examiner

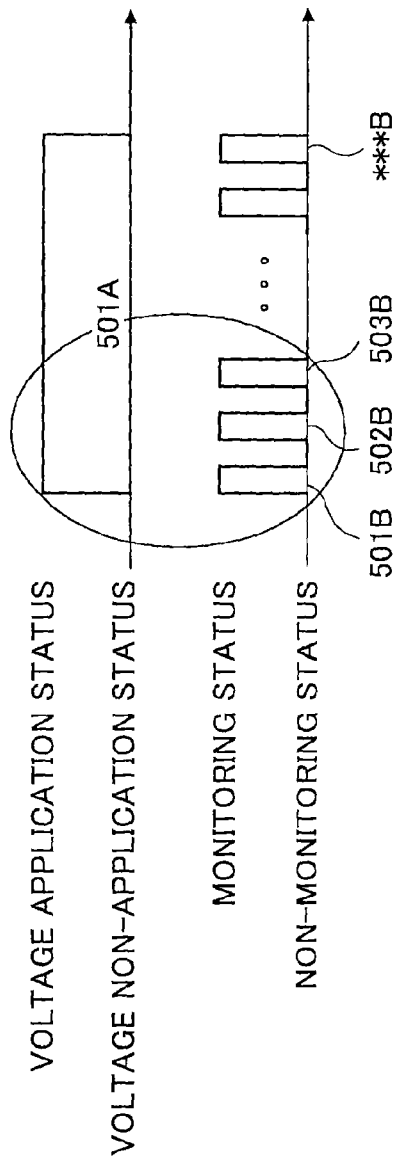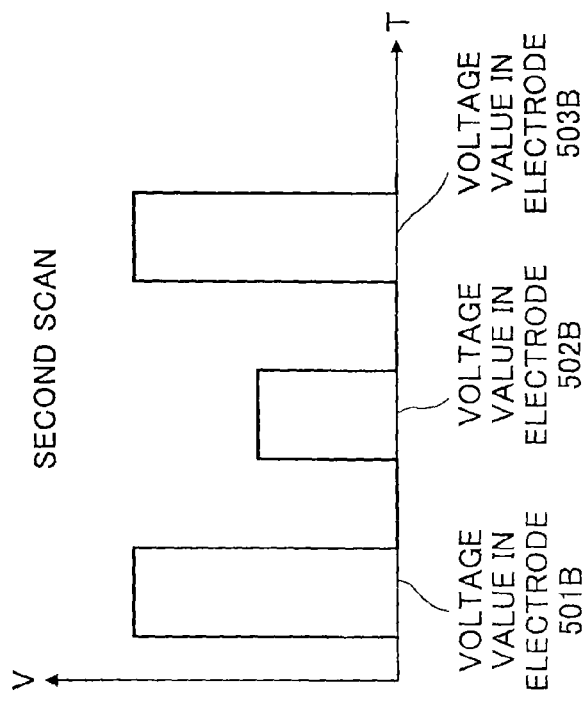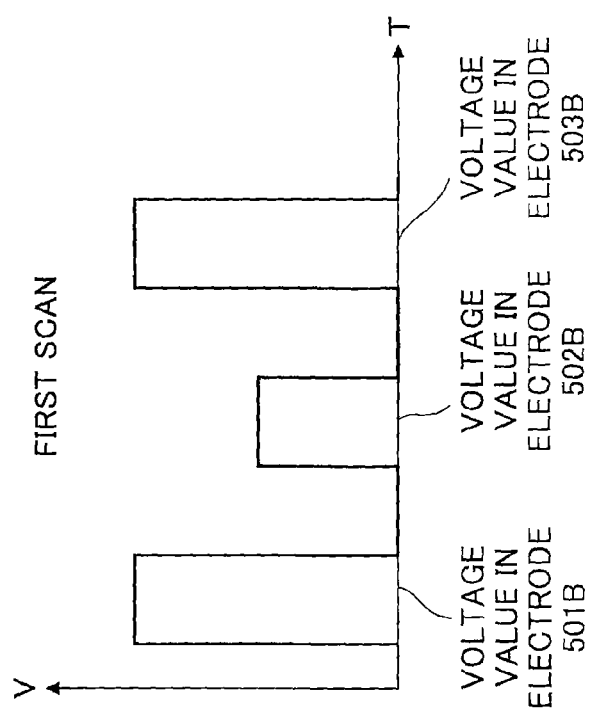

FIG.13

| TYPE | LIGHT-ON TIME | LIGHT-OFF TIME | STATUS |
|---|---|---|---|
| 0 | 1 | 0 | HANDWRITING PEN |
| 1 | 1 | 1 | ERASER |
| 2 | 3 | 1 | HANDWRITE WITH PEN TIP 1 |
| 3 | 4 | 2 | HANDWRITE WITH PEN TIP 2 |

COORDINATES INPUT SYSTEM, COORDINATES INPUT APPARATUS, AND COORDINATES INPUT METHOD

BACKGROUND OF THE INVENTION

1. Field of the Invention

The disclosures herein generally relate to a coordinates input system, a coordinates input apparatus, and a coordinates input method.

2. Description of the Related Art

There are known in the related art coordinates input systems in which handwritten characters and the like are input by pointing devices such as an electronic pens into coordinates input apparatuses such as an electronic information boards having coordinates detection functions to display input results.

Such coordinates input systems propose various types of coordinate detection methods for detecting coordinates of the positions touched by a tip of the pointing device. For example, Japanese Laid-open Patent Publication No. 2011-145762 (hereinafter referred to as "Patent Document 1") discloses an electrostatic capacitance type coordinates detection method.

The electrostatic capacitance type coordinates detection method has an advantage of simplifying a structure of the pointing device. Specifically, the pointing device may simply include a conductive member for connecting between the tip and a gripper of the pointing device without having to connect the pointing device to the coordinates input apparatus with wiring, or without having to perform communications between the pointing device and the coordinates input apparatus. This may lead to reduction in size and weight of the pointing device as well as reducing a failure frequency of the pointing device.

However, the electrostatic capacitance type coordinates detection method may also detect coordinates of positions touched by user's hands or fingers in addition to the coordinates of the positions touched by the pointing device. Hence, when the user tends to press the coordinates input apparatus with the user's fingers or hands while inputting handwritten characters and the like with the pointing device, the contact positions of the user's fingers or hands may be drawn on the coordinates input apparatus.

Hence, it is desired to implement a configuration of the coordinates input system employing the electrostatic capacitance type coordinates detection method capable of clearly identifying an input made by the pointing device and an input made by those other than the pointing device while maintaining the simplified structure of the pointing device.

RELATED ART DOCUMENT

Patent Document

Patent Document 1: Japanese Laid-open Patent Publication No. 2011-145762

SUMMARY OF THE INVENTION

Accordingly, it is a general object in one embodiment of the present invention to provide a coordinates input system having an electrostatic capacitance type coordinates detection method, a coordinates input apparatus, and a coordinates input method that substantially obviate one or more problems caused by the limitations and disadvantages of the related art.

According to an aspect of embodiments, there is disclosed a coordinates input system that includes a coordinates input apparatus; and a pointing device. The coordinates input apparatus includes a detector configured to detect a voltage value of each of intersection points between electrodes arranged in an electrode part, and a determination part configured to determine whether coordinates are input into the electrode part by the pointing device based on the voltage value detected by the detector. The pointing device includes a switching part configured to switch conductivity between a contact part configured to be in contact with the electrode part and a gripper held by a user, and a controller configured to switch the conductivity between the contact part and the gripper at a switching period longer than a detection period in the detector of the coordinates input apparatus. The determination part of the coordinates input apparatus determines whether the coordinates input into the electrode part are made by the pointing device based on a change in each of the voltage values of the intersection points within a time corresponding to the switching period.

Other objects, features and advantages of the present invention will become more apparent from the following detailed description when read in conjunction with the accompanying drawings.

BRIEF DESCRIPTION OF THE DRAWINGS

FIGS. 9A to 9G are diagrams illustrating a voltage value detected by the receiver;

FIG. 13 is a diagram illustrating a list of contents of a lighting status of an emitter controlled by an emission controller;

DETAILED DESCRIPTION OF THE PREFERRED EMBODIMENTS

Figure 1:
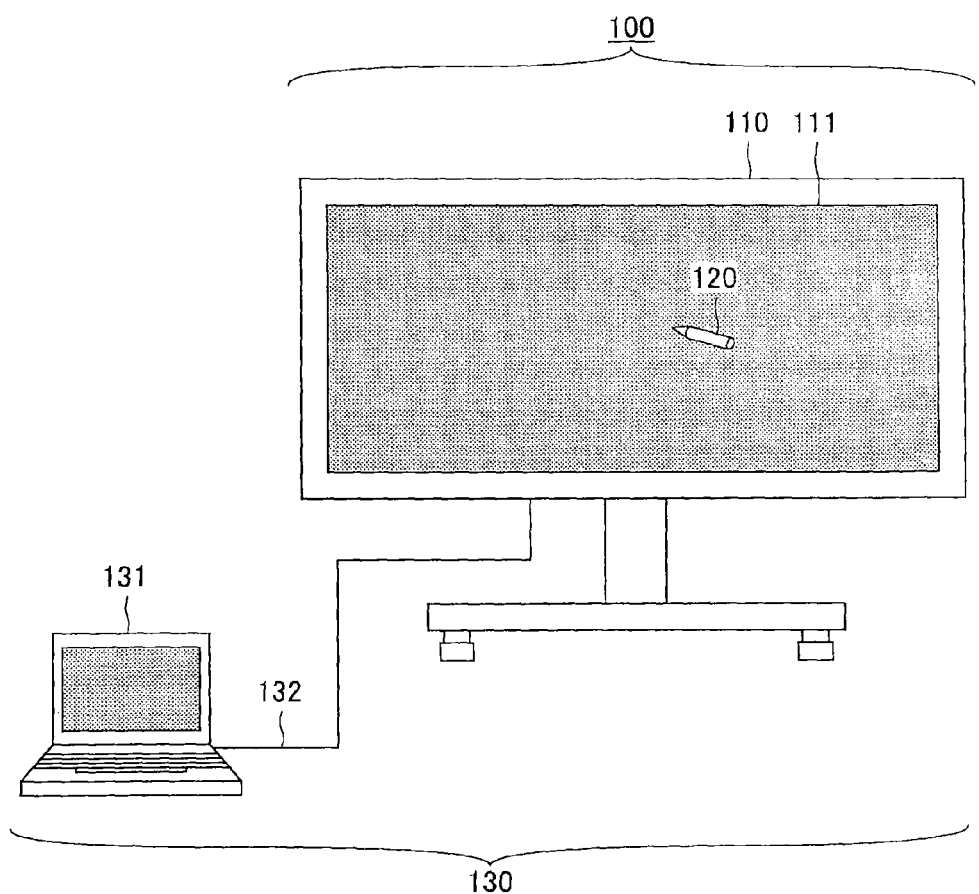
FIG. 1 is a diagram illustrating an external configuration of a display system including a coordinates input system according to an embodiment.

In the following, a description is given of embodiments of the present invention with reference to the accompanying drawings. Note that duplicated descriptions may be omitted by assigning identical reference numerals to those components having substantially the same functional configurations in the specification and the drawings of the present application.

First Embodiment

External Configuration of Coordinates Input System

Initially, a description is given of an external configuration of a coordinates input system according to an embodiment. FIG. 1 is a diagram illustrating an external configuration of a coordinates input system 100 according to an embodiment. Note that FIG. 1 illustrates a configuration of a display system 130 including the coordinates input system 100 and a user PC 131 connected to the coordinates input system 100 so as to display an image supplied from the user PC 131.

As illustrated in FIG. 1, the coordinates input system 100 includes an electronic information board 110 serving as a coordinates input apparatus having a coordinates detecting function, and an electronic pen 120 serving as a pointing device configured to transmit instructions to input coordinates to the electronic information board 110 so as to input handwritten characters.

The electronic information board 110 receives a display image from the user PC 131, and displays the supplied display image on an input-output surface 111. Further, a user may handwrite an image with the electronic pen 120 to generate a drawing image such that the electronic information board 110 displays the drawing image superimposed on the display image on the input-output surface 111 of the electronic information board 110. Note that the input-output surface 111 is provided with an electrode part (details are described later) having plural electrodes arranged on the input-output surface 111 in a lattice form. In the electronic information board 110, an electrostatic capacitive coordinates detecting function is implemented by measuring an electrostatic capacitance of a capacitor at each of the intersection points between the electrodes arranged in the electrode part.

The electronic pen 120 includes a conductive member disposed between a tip serving as a contact part that makes contact with the input-output surface 111, and a gripper for a user. When a user touches the input-output surface 111 with the electronic pen 120, the electrostatic capacitance of the capacitor at an intersection point corresponds to a touched position (contact position) of the input-output surface 111. As a result, the electronic information board 110 may detect the contact position of the tip of the electronic pen 120.

The user PC 131 serves as an image supply device configured to store a display image to be displayed on the electronic information board 110, such that the user PC 131 supplies the display image to the electronic information board 110 at a predetermined frame rate (e.g., 30 frames per sec.) via an interface to output the display image as image signals.

Note that in the first embodiment, the user PC 131 includes a not-illustrated VGA output terminal as the interface to supply VGA signals serving as the image signals to the electronic information board 110 via a cable 132 such as a VGA cable.

Hardware Configuration of Electronic Information Board

Figure 2:
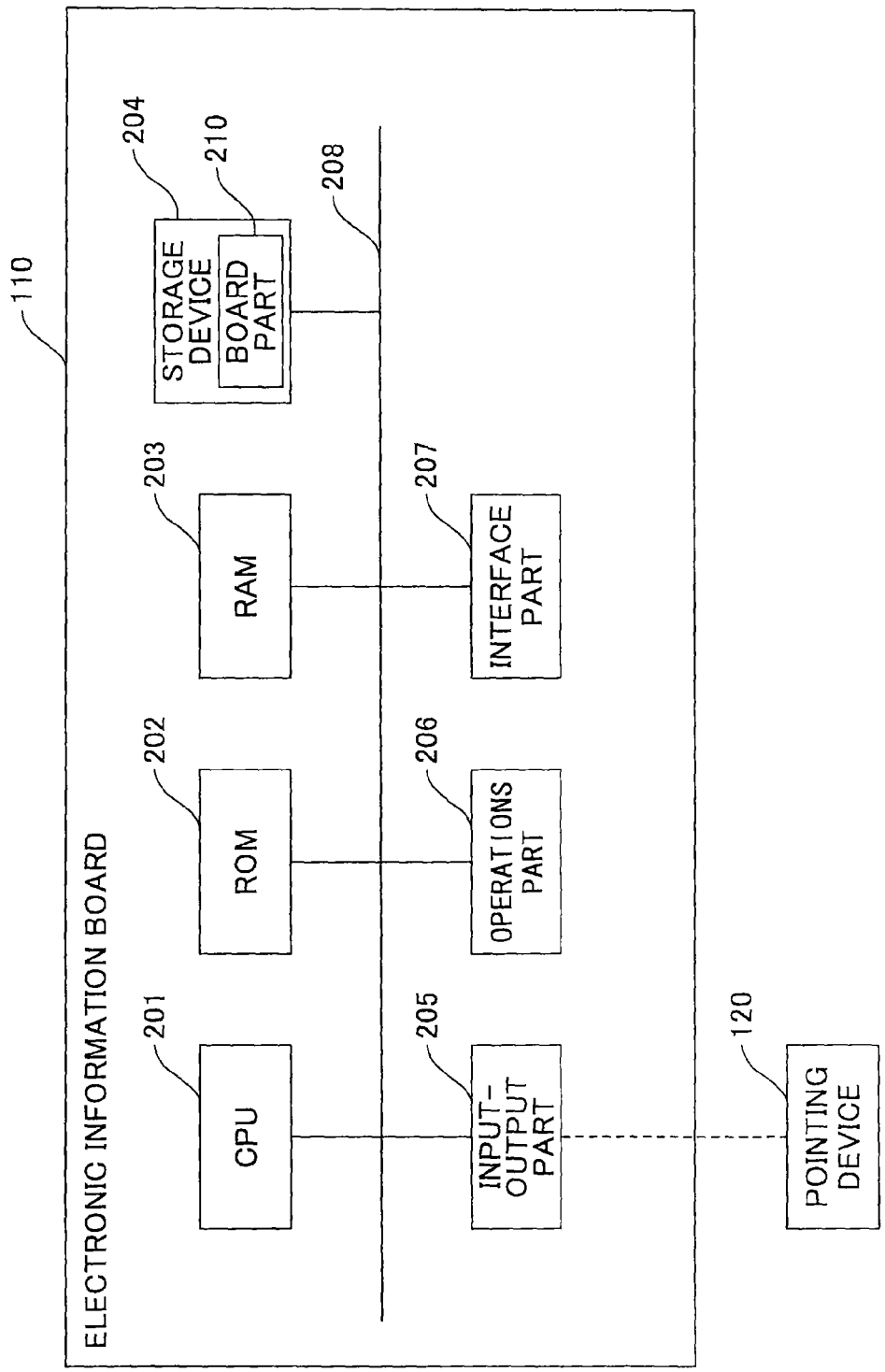
FIG. 2 is a diagram illustrating a hardware configuration of an electronic information board as an example of a coordinates input apparatus.

Next, a description is given of a hardware configuration of the electronic information board 110. FIG. 2 is a diagram illustrating the hardware configuration of the electronic information board 110.

As illustrated in FIG. 2, the electronic information board 110 includes a CPU (central processing unit) 201, a ROM (read only memory) 202, a RAM (random access memory) 203, and storage device 204. The electronic information board 110 further includes an input-output part 205, an operations part 206, and an interface part 207. Note that the components of the electronic information board 110 are connected via a bus 208.

The CPU 201 is a processor configured to execute a program stored in the storage device 204 to function as a board part 210.

The ROM 202 is a non-volatile memory. The ROM 202 is configured to store various types of programs, data, and the like that are necessary for the CPU 201 to execute a program to cause the CPU 201 to function as the board part 210. Specifically, the ROM 202 is configured to store boot programs such as a BIOS (basic input/output system) and an EFI (extensible firmware interface).

The RAM 203 is a main storage device such as a DRAM (dynamic random access memory) or a SRAM (static random access memory). The RAM 203 is configured to serve as a work area in which a program functioning as the board part 210 is loaded when the program is executed by the CPU 201.

The storage device 204 is configured to store the later-described snapshots in addition to storing the program to function as the board part 210.

The input-output part 205 includes the input-output surface 111, and is configured to display the display image supplied from the user PC 131. Further, the input-output part 205 is configured to detect the contact positions of the tip of the electronic pen 120, and display drawing images such as handwritten characters generated based on the detected contact positions.

The operations part 206 includes various types of hardware switches including a power supply switch of the electronic information board 110. The interface part 207 serves as an interface for connecting the electronic information board 110 to an external apparatus such as the user PC 131 so that the electronic information board 110 is capable of communicating with the external apparatus.

Functional Configuration of Electronic Information Board

Figure 3:
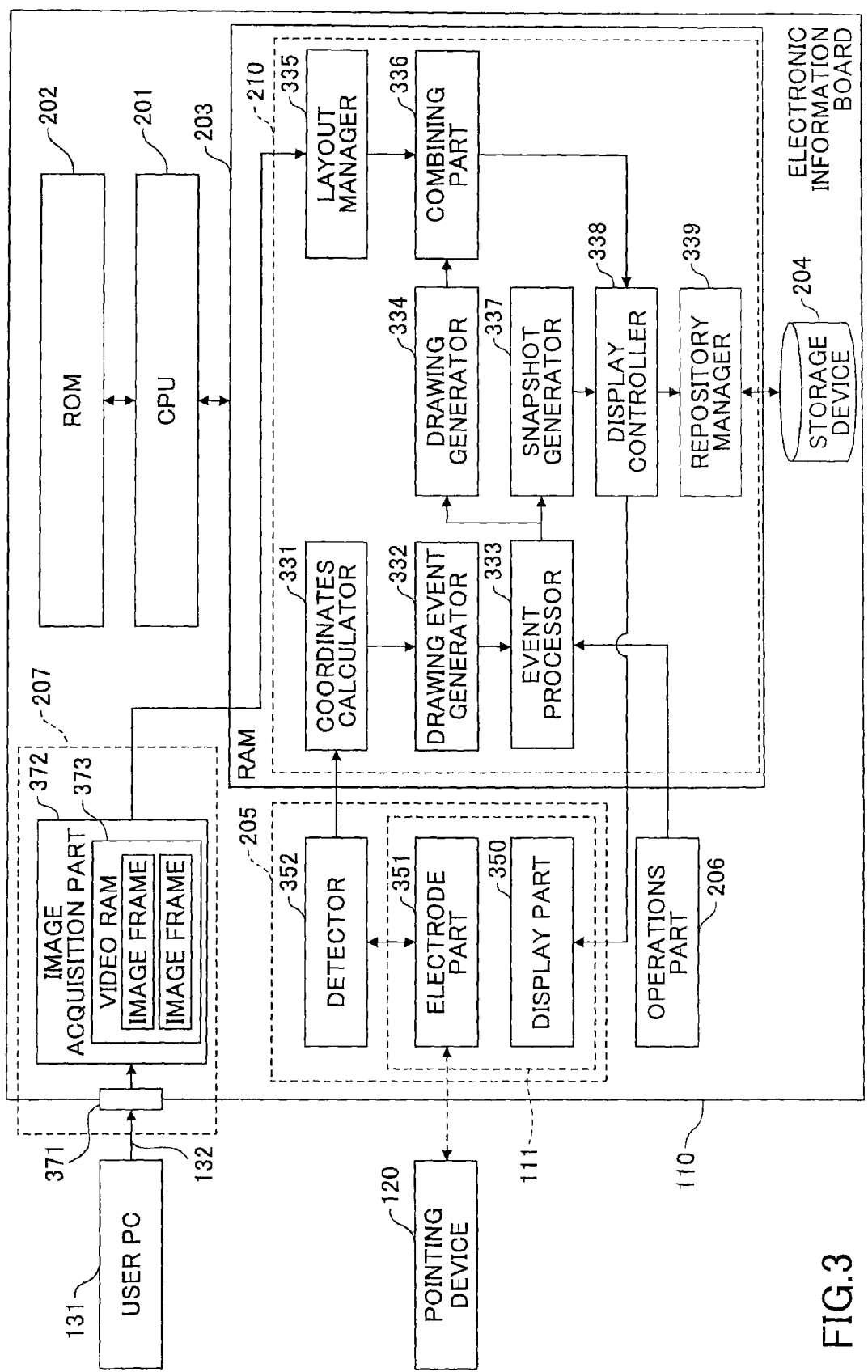
FIG. 3 is a diagram illustrating a functional configuration of the electronic information board as the example of the coordinates input apparatus.

Next, a description is given of a functional configuration of the electronic information board 110. FIG. 3 is a diagram illustrating the functional configuration of the electronic information board 110, including a detailed description of the functions implemented by the components of the hardware configuration illustrated in FIG. 2.

As illustrated in FIG. 3, the interface part 207 includes an image input interface 371, and an image acquisition part 372.

The image input interface 371 serves as an interface configured to receive the display image supplied by the user PC 131 as image signals. In the first embodiment, a DVI connector composed of a DVI (digital video interface) terminal is used as an image input interface 371. The image input interface 371 is configured to receive VGA signals from the user PC 131 via the cable 132 such as the VGA cable and supply the VGA signals to the image acquisition part 372.

The image acquisition part 372 is configured to acquire the image signals received via the image input interface 371. The image acquisition part 372 is configured to analyze the acquired image signals, derive image information such as the resolution of an image frame or a frame rate of the image frames, and transmit the derived image information to a layout manager 335.

Further, the image acquisition part 372 is configured to form the image frame serving as the display image of the user PC 131 by using the image signals, and overwrite and save the image frame in a video RAM 373 serving as a storage part configured to temporarily store the image frame. Further, the image acquisition part 372 is configured to transmit the formed image frame to the layout manager 335.

The input-output part 205 includes a display part 350, an electrode part 351, and a detector 352. The display part 350 is configured to display various types of images (e.g., the display image, the drawing image, and a combined image of the display image and the drawing image) based on instructions from the display controller 338.

The electrode part 351 is disposed at the front of the display part 350 such that the electrode part 351 and the display part 350 form the input-output surface 111. The electrode part 351 includes plural electrodes arranged in a lattice form, and is configured to change the electrostatic capacitance of the capacitor by the touch of the tip of the electronic pen 120 at the intersection point between the electrodes.

The detector 352 is configured to input a voltage signal into each of the electrodes of the electrode part 351, and converting a current signal output from each of the electrodes into a voltage signal to acquire a voltage value. Further, the detector 352 is configured to determine whether the intersection point between the electrodes is touched by the tip of the electronic pen 120.

The program serving as the board part 210 is read by the CPU 201 from the storage device 204 and loaded in the RAM 203.

The program serving as the board part 210 includes a coordinates calculator 331, a drawing event generator 332, and an event processor 333 of program parts. The program serving as the board part 210 further includes a drawing generator 334, a layout manager 335, a combining part 336, a snapshot generator 337, a display controller 338, and a repository manager 339.

The coordinates calculator 331 is configured to calculate coordinates of the contact position in the input-output surface 111 touched by the tip of the electronic pen 120.

The drawing event generator 332 is configured to issue various types of events based on outputs of the coordinates calculator 331. The events issued by the drawing event generator 332 includes an event (TOUCH) reporting that the electronic pen 120 has touched the input-output surface 111. Further, the events issued by the drawing event generator 332 includes an event (MOVE) reporting that the touched position (contact position) is moved while the electronic pen 120 is still in contact with the input-output surface 111. In addition, the events issued by the drawing event generator 332 includes an event (RELEASE) reporting that the electronic pen 120 is detached from the input-output surface 111.

Note that these events include the coordinates of the contact position calculated by the coordinates calculator 331.

The event processor 333 is configured to process the event issued by the operations part 206 (e.g., the power supply switch of the electronic information board 110) or the drawing event generator 332. The event processor 333 is configured to implement a function corresponding to the event received from the operations part 206 or the drawing event generator 332.

The drawing generator 334 is configured to generate a drawing image based on the handwritten input into the input-output surface 111 performed by the user using the electronic pen 120. Specifically, the drawing generator 334 is configured to generate a drawing image by changing the color at the coordinates of the contact position calculated by the coordinates calculator 331 into a specific color to draw an image layer.

The layout manager 335 is configured to acquire an image frame stored in the video RAM 373. Further, the layout manager 335 is configured to change the size of the image frame to fit the size of the input-output surface 111 to draw an image layer.

The combining part 336 is configured to combine various types of image layers to generate a combined image. The combining part 336 is configured to combine the image layer (hereinafter called an "image capture layer") of the display image of the user PC 131 drawn by the layout manager 335, and the image layer (hereinafter called a "handwritten layer") of the drawing image generated by the drawing generator 334.

The display controller 338 is configured to control the display part 350. The display controller 338 is configured to display the combined image generated by the combining part 336 to the display part 350 of the input-output surface 111. In the first embodiment, the combining part 336 and the display controller 338 combine the image layers at a frame period identical to that of the frame rate of the image frame included in the display image supplied from the user PC 131 to display the combined image layer on the display part 350.

The snapshot generator 337 is configured to generate a snapshot image of the combined image of the display image supplied from the user PC 131 and the drawing image generated by the drawing generator 334. The snapshot generator 337 is configured to operate by the depression of a snapshot button (included in the operations part 206 of FIG. 2) that gives an instruction to acquire the combined image displayed on the display part 350 as a snapshot image. Specifically, when the event processor 333 receives a selection report event by the selection of the snapshot button, the snapshot generator 337 combines the image capture layer and the handwritten layer to generate a snapshot image.

When generating the snapshot image, the snapshot generator 337 gives an instruction to the repository manager 339 to store the generated snapshot image in the storage device 204.

The repository manager 339 is configured to control the storage device 204 to store the snapshot image. The repository manager 339 stores the snapshot image in the storage device 204 by receiving the instruction from the snapshot generator 337.

Figure 4A:
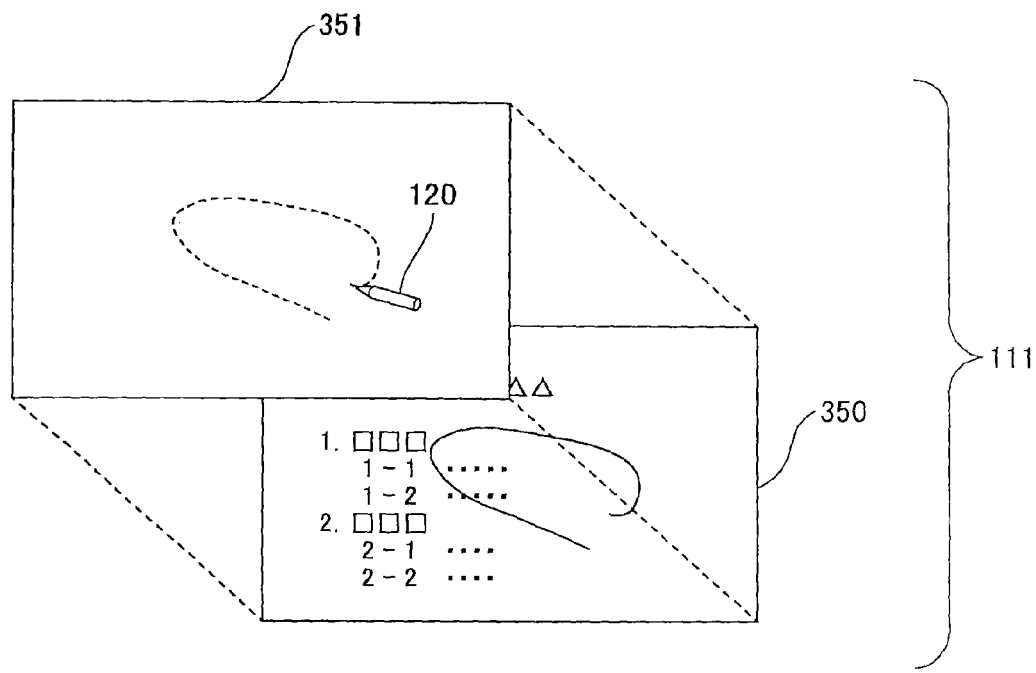
FIG. 4A is a diagram illustrating a configuration of an input-output surface of the electronic information board.
Figure 4B:
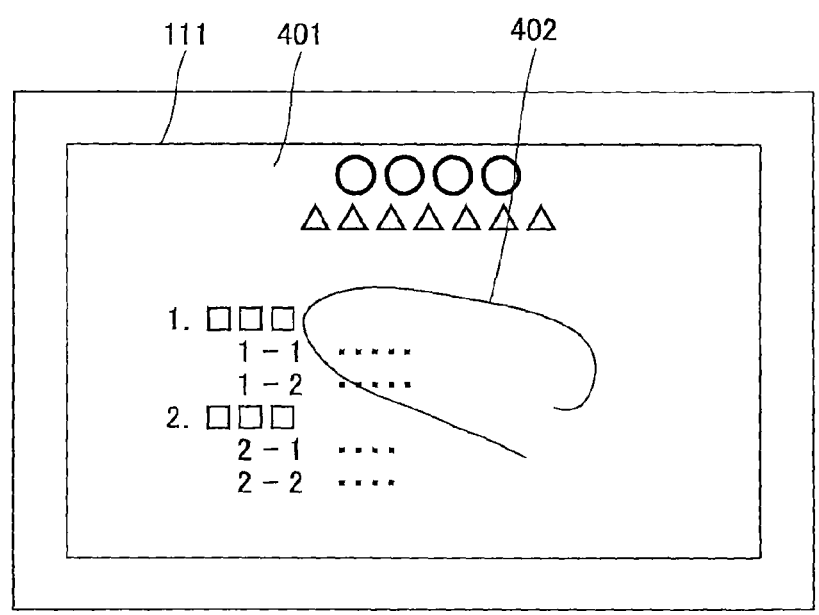
FIG. 4B is a diagram illustrating an example of an image displayed on the input-output surface.

Configuration of Input-Output Surface and Example of Image Displayed on the Input-Output Surface Next, an illustration is given of a configuration of the input-output surface 111 and an image displayed on the input-output surface 111. FIGS. 4A and 4B illustrate a configuration of the input-output surface 111, and an example of the combined image displayed on the input-output surface 111. As illustrated in FIG. 4A, the input-output surface 111 includes the display part 350, and the electrode part 351 disposed at the front of the display part 350.

When the user moves the tip of the electronic pen 120 on the electrode part 351 with the tip of the electronic pen 120 being in contact with the electrode part 351, the electrostatic capacitance of the electrode part 351 changes at each of the positions (indicated by broken lines) passed by the tip of the electronic pen 120. Hence, the detector 352 detects the change in the electrostatic capacitance of the electrode part 351 at each of the positions passed by the electronic pen 120. The coordinates calculator 331 calculates coordinates of each of the positions passed by the electronic pen 120, and the drawing generator 334 generates the drawing image based on the calculated coordinates.

The display part 350 displays the combined image composed of the display image supplied from the user PC 131 and the drawing image generated by the drawing generator 334.

As a result, as illustrated in FIG. 4B, the input-output surface 111 is configured to display the combined image composed of the display image 401 supplied from the user PC 131 and the drawing image 402 generated by the drawing generator 334.

Illustration of Electrode Part and Detector

Figure 5:
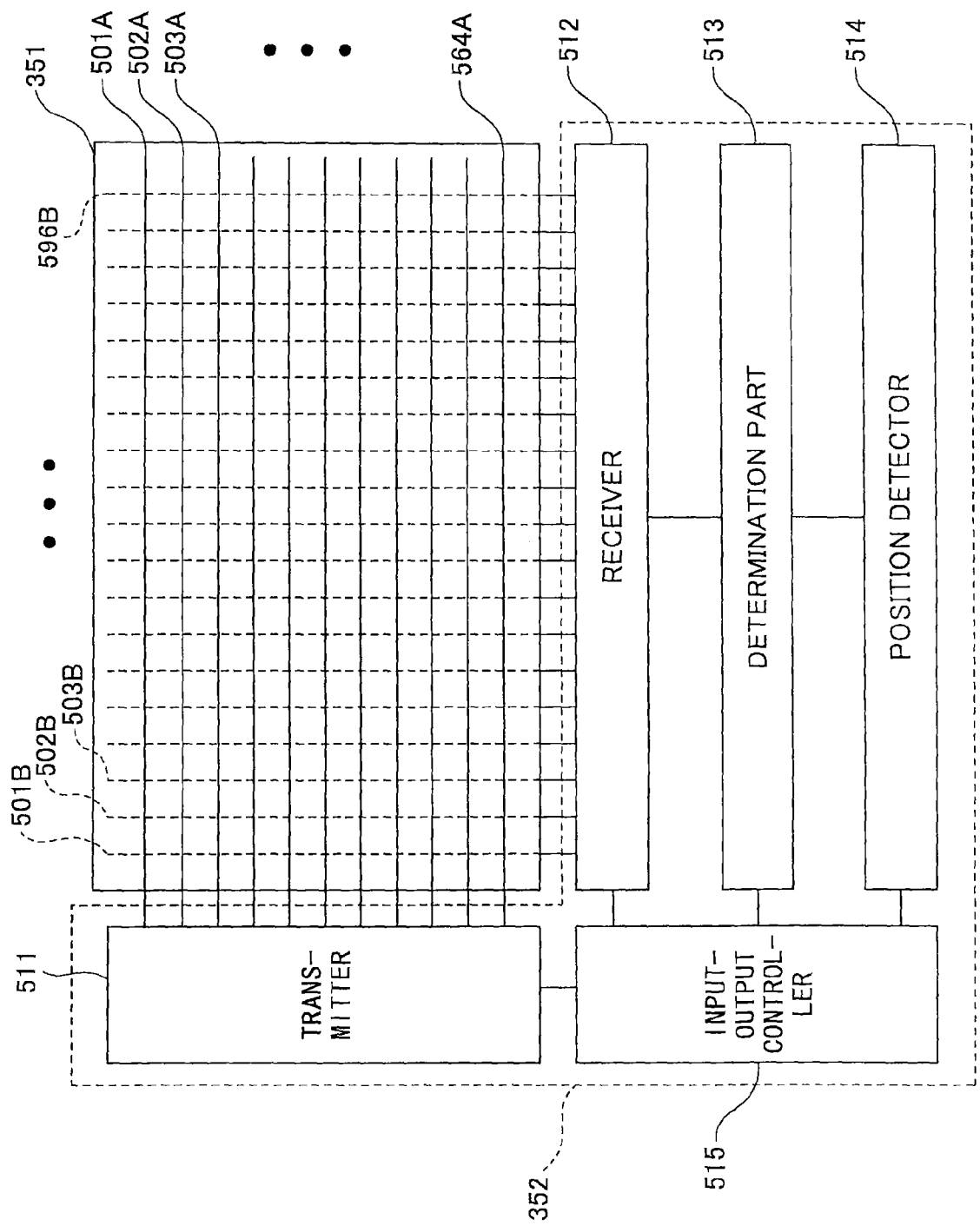
FIG. 5 is a diagram illustrating a configuration of an electrode part and a detector of the electronic information board.

Next, an illustration is given of configurations of the electrode part 351 and the detector 352 among components forming the input-output part 205. FIG. 5 is a diagram illustrating detailed configurations of the electrode part 351 and the detector 352.

As illustrated in FIG. 5, the electrode part 351 includes a first electrode group (501A, 502A, 503A, ..., 564A) having plural electrodes linearly extending in a lateral direction that are disposed at equal intervals in a vertical direction. The first electrode group is connected to a transmitter 511 forming the detector 352. Note that in the following description, the number of electrodes forming the first electrode group is 64; however, the number of electrodes forming the first electrode group is not limited to this example.

Further, the electrode part 351 includes a second electrode group (501B, 502B, 503B, ..., 564B) having plural electrodes linearly extending in a vertical direction that are disposed at equal intervals in a lateral direction. The second electrode group is connected to a receiver 512 forming the detector 352. Note that in the following description, the number of electrodes forming the second electrode group is 96; however, the number of electrodes forming the second electrode group is not limited to this example.

As described above, the electrode part 351 includes the electrodes disposed in a lattice form, and a capacitor is formed at each of the intersection points between the electrodes forming the first electrode group and the electrodes forming the second electrode group. Hence, a voltage signal is sequentially supplied from the transmitter 511 to each of the electrodes of the first electrode group, which causes current according to the electrostatic capacitance of the capacitor at each of the intersection points to flow in a corresponding one of the electrodes of the second electrode group.

The receiver 512 is configured to detect a voltage value by converting the current flowing in each of the electrodes of the second electrode group into a voltage.

Note that when the user touches a predetermined intersection point with the tip of the electronic pen 120, the electrostatic capacitance of the capacitor at the predetermined intersection point changes to reduce the current flowing in the corresponding electrode of the second electrode group. Hence, the receiver 512 may be able to detect the touch of the tip of the electronic pen 120 as a reduction of the voltage value.

In this case, the receiver 512 identifies the electrode receiving the voltage signal from the transmitter 511 among those of the first electrode group, and the electrode having the reduced voltage value among those of the second electrode group. Accordingly, the receiver 512 may be able to identify the intersection point corresponding to the contact position (touched position) of the tip of the electronic pen 120.

Further, the determination part 513 is configured to monitors a change of the voltage value at the detected intersection point so as to determine whether the change of the voltage value is caused by the touch of the tip of the electronic pen 120 or the touch of those other than the tip of the electronic pen 120. Note that a detailed description of the determination part 513 will be described later.

When the determination part 513 determines that the intersection point is touched by the tip of the electronic pen 120, the position detector 514 transmits information associated with the electrode identified by the receiver 512 to the coordinates calculator 331.

Note that an input-output controller 515 is configured to control the above-described processes performed by the components of the detector 352.

Illustration of Operations of Transmitter and Receiver

Next, an illustration is given of operations of the transmitter 511 and the receiver 512 among components forming the detector 352.

Figure 6:
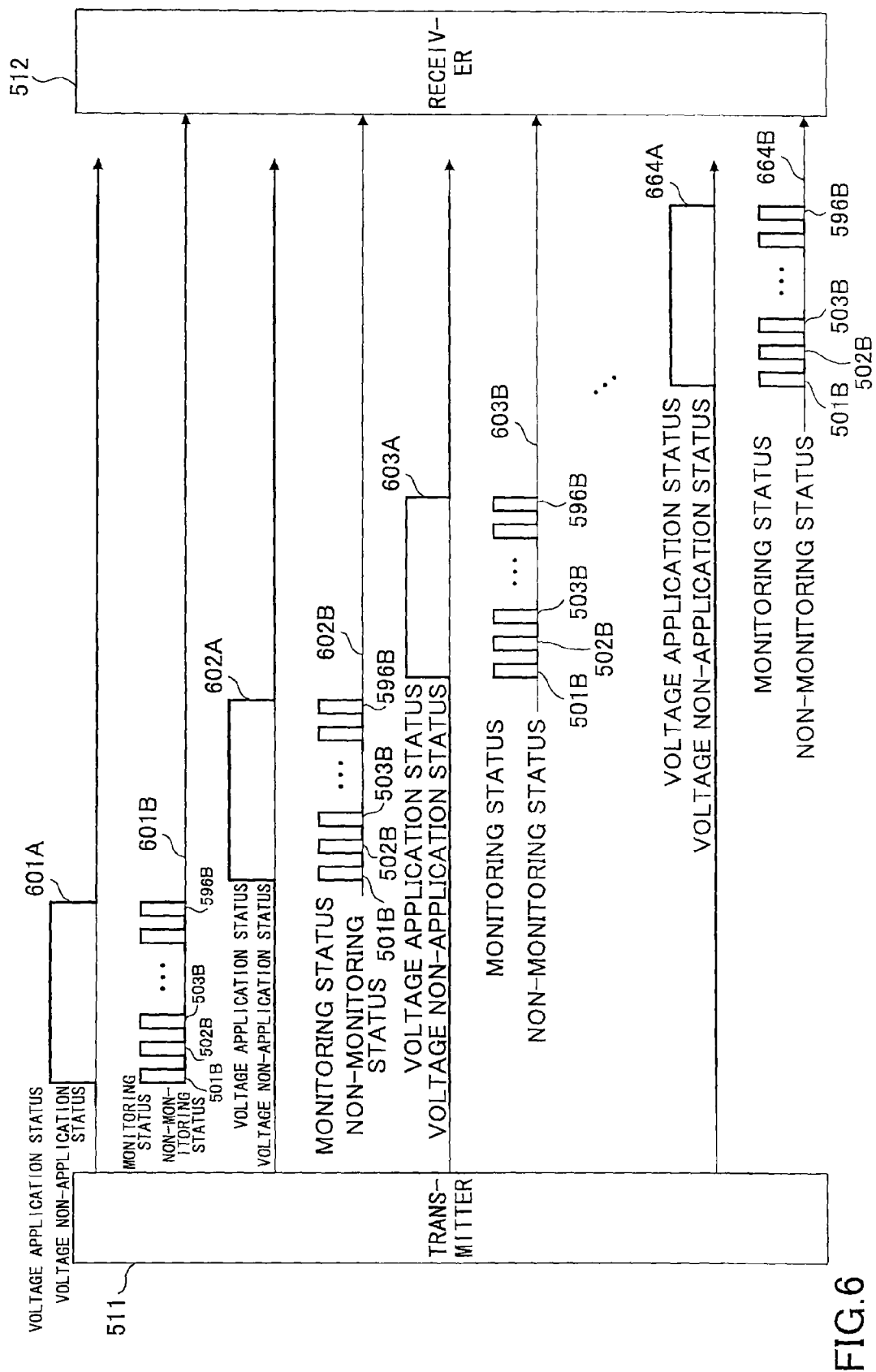
FIG. 6 is a diagram illustrating operations of a transmitter and a receiver forming the detector.

FIG. 6 is a diagram illustrating an input timing at which the transmitter 511 inputs a voltage signal into the first electrode group of the electrode part 351, and a monitoring timing at which the receiver 512 monitors a current output from the second electrode group of the electrode part 351.

In FIG. 6, voltage signals 601A, 602A, 603A, ..., 664A indicate input timing at which the transmitter 511 inputs the voltage signals to the first electrode group (501A, 502A, 503A, ..., 564A).

As illustrated in FIG. 6, the transmitter 511 sequentially inputs the voltage signal into the first electrode group from the electrodes 501A to 564A. When finishing the voltage signal input into the electrode 564A, the transmitter 511 sequentially inputs the voltage signal into the first electrode group from the electrodes 501A onward again.

In the meantime, the receiver 512 monitors the currents output from the second electrode group (501B, 502B, 503B, ..., 596B) based on monitor signals 601B, 602B, 603B, ..., 664B.

As illustrated in FIG. 6, while the transmitter 511 inputs the voltage signal 601A into the electrode 501A, the receiver 512 operates based on the monitor signal 601B to monitor the currents output from the electrodes 501B, 502B, 503B, ..., 596B.

Specifically, the receiver 512 initially detects a current output from the electrode 501B with respect to the voltage signal 601A input into the electrode 501A, and converts the detected current into a voltage value. That is, the receiver 512 detects the voltage value with respect to the electrostatic capacitance of the capacitor at the intersection point between the electrode 501A and the electrode 501B.

Subsequently, the receiver 512 detects a current output from the electrode 502B with respect to the voltage signal 601A input into the electrode 501A, and converts the detected current into a voltage value. That is, the receiver 512 detects the voltage value with respect to the electrostatic capacitance of the capacitor at the intersection point between the electrode 501A and the electrode 502B.

Likewise, in the subsequent processes, while the transmitter 511 inputs the voltage signal 601A into the electrode 501A, the receiver 512 sequentially detects the current outputs from the electrodes 503B to 596B to sequentially convert the detected currents into the voltage values. That is, the receiver 512 sequentially detects the voltage values corresponding to the electrostatic capacitance of the capacitor from the intersection point between the electrodes 501A and 503B to the intersection point between the electrodes 501A and 596B.

When completing the detection of the voltage values corresponding to the electrostatic capacitances of the capacitors at the intersection points between the electrode 501A and the electrodes 501B to 596B, the receiver 512 subsequently performs detection of voltage values corresponding to the electrostatic capacitances of the capacitors at the intersection points between the electrode 502A and the electrodes 501B to 596B.

Specifically, while the transmitter 511 inputs the voltage signal 602A into the electrode 502A, the receiver 512 operates based on the monitor signal 602B to monitor the currents output from the electrodes 501B, 502B, 503B, . . . , 596B.

Note that the receiver 512 may be able to detect the respective voltage values of the electrostatic capacitances of the capacitors at all the intersection points between the electrodes of the first electrode group and the electrodes of the second electrode group by executing processes similar to the above at the timing of inputting the voltage signal into each of the electrodes of the first electrode group.

Note that a process of detecting the voltage values of the electrostatic capacitance of the capacitors at all the intersection points between the electrodes of the first electrode group and the electrodes of the second electrode group is hereinafter referred to as a "scan process". In the first embodiment, the electrode part 351 of the electronic information board 110 is configured such that a period (scan period) between the first scan process and the second scan process is approximately 1 ms. Note that from the viewpoint of the receiver 512, this scan period serves as a detection period for detecting the voltage values of the electrostatic capacitance of the capacitors at all the intersection points.

Configuration and Operations of Electronic Pen

Figure 7A:
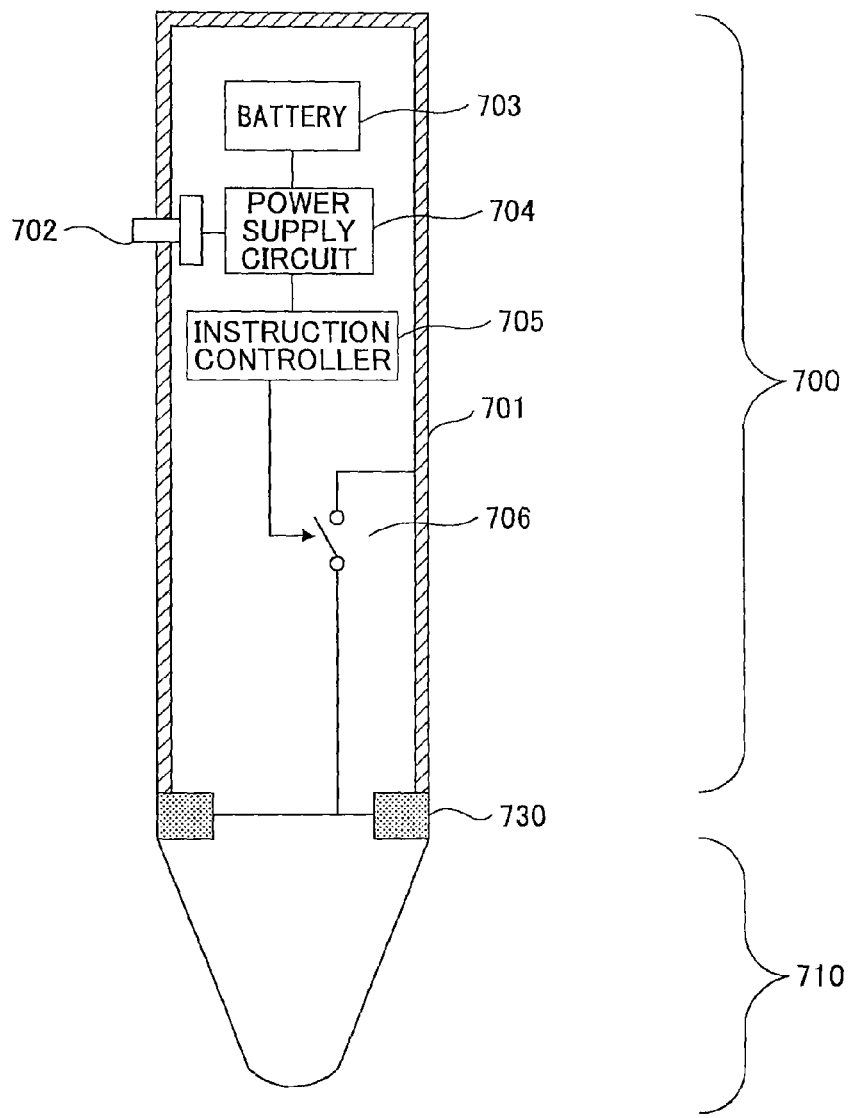
FIG. 7A is a diagram illustrating a configuration of a pointing device.
Figure 7B:
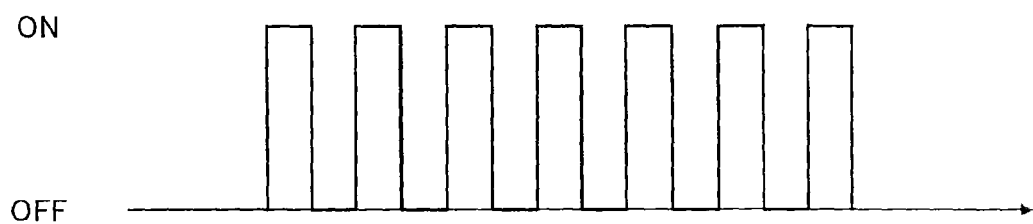
FIG. 7B is a diagram illustrating operations of the pointing device.

Next, an illustration is given of a configuration and operations of the electronic pen 120. FIGS. 7A and 7B are diagrams illustrating a configuration and operations of the electronic pen 120.

As illustrated in FIG. 7A, the electronic pen 120 includes a tip 710 and a body 700 that is connected to the tip 710 via an insulator 730.

The tip 710 is formed of a conductive synthetic resin material, and is electrically connected to a gripper 701 of the body 700 via a connection switch 706.

In the body 700, the gripper 701 is formed of a conductive synthetic resin material, and includes an area touched by a user's hand or fingers.

A battery 703 is a power supply to supply power to an instruction controller 705 via a power supply circuit 704. In a state where a power supply switch 702 is turned on, the power is supplied to the instruction controller 705 via the power supply circuit 704. When the power supply switch 702 is turned off, the power supplied to the instruction controller 705 is stopped.

The instruction controller 705 performs control of repeating on/off of the connection switch 706 while receiving the power supply from the battery 704 via the power supply circuit 704. FIG. 7B illustrates operations of the connection switch 706 while the power supply switch 702 is turned on to supply the power from the battery 703 to the instruction controller 705 via the power supply circuit 704.

The connection switch 706 is an electronic switch (e.g., a transistor such as FET). The on/off of the connection switch 706 is controlled by the instruction controller 705 so that the connection switch 706 functions as a switching part to switch the conductivity between the tip 710 and the gripper 701.

In a state where the connection switch 706 is turned off, the tip 710 is electrically disconnected from the gripper 701. When the user touches the electrode part 351 with the electronic pen 120 while the tip 710 is electrically disconnected from the gripper 701, little change may be detected in the electrostatic capacitance of the capacitor at the intersection point corresponding to the contact position of the electrode part 351. This is because the electrostatic capacitance of the tip 710 is extremely small. That is, when the user touches the electrode part 351 with the electronic pen 120 while the tip 710 is electrically disconnected from the gripper 701, the change in the current flowing in the second electrode group may be small.

In a state where the connection switch 706 is turned on, the tip 710 is electrically connected to the gripper 701. Hence, when a user grips the gripper 701, the tip 710 is electrically connected with a human body. In general, a human body has a large electrostatic capacitance. Hence, when the user grips the gripper 701 and touches the electrode part 351 with the electronic pen 120 while the connection switch 706 is turned on, the electrostatic capacitance at the intersection point corresponding to the contact position largely changes.

Specifically, since a part of the voltage signal input into the first electrode group is discharged from the contact position of the electronic pen 120 via the human body, the current output from the electrode forming the intersection point corresponding to the contact position is reduced. That is, when the user touches the electrode part 351 with the electronic pen 120 while the tip 710 is electrically connected to the gripper 701, the change in the current flowing in the second electrode group may be large.

Relationship Between Scan Period and Switching Period of the Connection Switch

Next, an illustration is given of a relationship between a scan period of the electrode part 351 of the electronic information board 110 and a switching period of the connection switch 706 of the electronic pen 120.

Figure 8A:
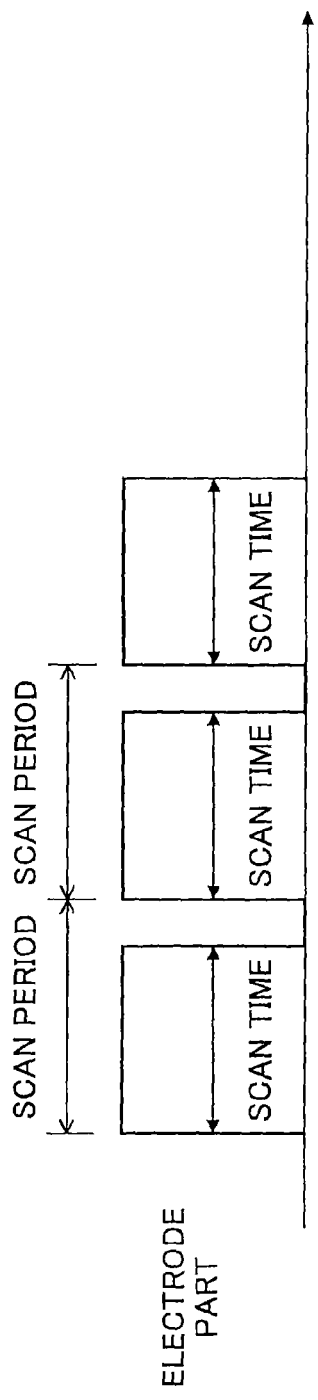
FIGS. 8A, 8B, and 8C are diagrams illustrating a relationship between a scan period of the electrode part and a switching period of a connection switch of the pointing device.
Figure 8B:
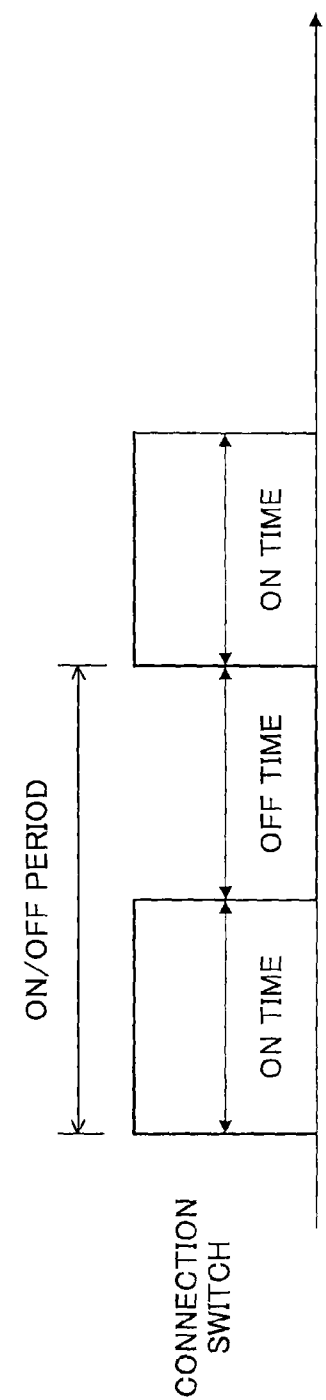
Figure 8C:
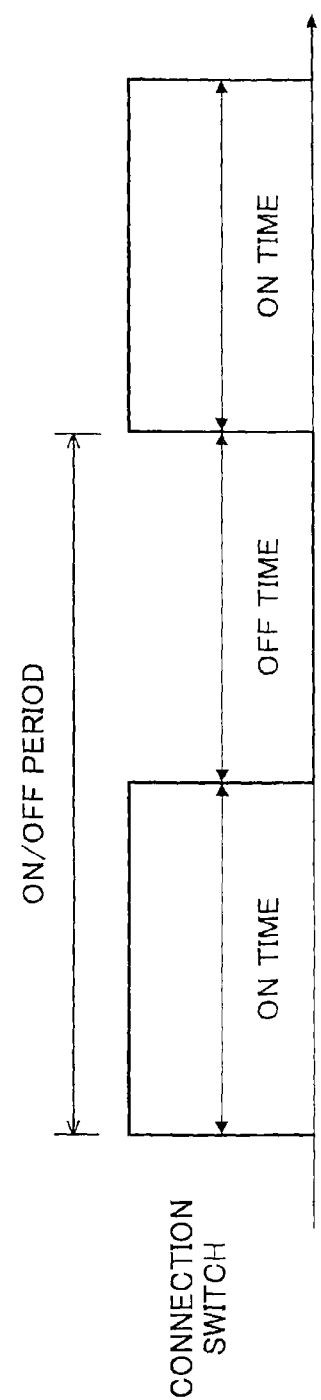

FIGS. 8A, 8B, and 8C are diagrams illustrating a relationship between a scan period of the electrode part 351 and a switching period of a connection switch 706. As illustrated in FIG. 8A, the electrode part 351 is configured to perform scan operations at a predetermined period. As illustrated in FIGS. 8B and 8C, on/off of the connection switch 706 is controlled at a switching period in accordance with the scan period.

FIG. 8B illustrates a case where the on/off of the connection switch 706 of the electronic pen 102 is controlled at a switching period twice the scan period of the electrode part 351 of the electronic information board 110. As illustrated in FIG. 8B, when the on/off of the connection switch 706 of the electronic pen 102 is set at a switching period twice the scan period of the electrode part 351 of the electronic information board 110, the connection switch 706 is in an on status in the first scan of the electrode part 351, and is an off status in the second scan of the electrode part 351.

That is, both the on status and the off status of the connection switch 706 may be detected by scanning the electrode part 351 twice.

FIG. 8C illustrates a case where the on/off of the connection switch 806 is controlled at a switching period three times the scan period of the electrode part 351. As illustrated in FIG. 8C, when the on/off of the connection switch 706 of the electronic pen 102 is set at a switching period three times the scan period of the electrode part 351 of the electronic information board 110, the connection switch 706 is in an on status in the first scan of the electrode part 351. Further, the connection switch 706 is in an on status or off status in the second scan of the electrode part 351, and is an off status in the third scan of the electrode part 351.

That is, both the on status and the off status of the connection switch 706 may be detected by scanning the electrode part 351 three times.

As described above, when a switching period of the connection switch 706 is set at n times longer than the scan period of the electrode part 351, both the on status and the off status of the connection switch 706 may be detected by scanning the electrode part 351 n times.

Illustration of Voltage Value Detected by the Receiver

Next, an illustration is given of voltage values detected by the receiver 512. FIGS. 9A to 9G are diagrams illustrating details of the voltage values detected by the receiver 512.

Note that the voltage values illustrated below are assumed to be those detected based on the current output from the electrodes 501B, 502B, and 503B when the voltage signal 601A is input in the electrode 501A for simplifying the illustration. Note that the illustration given below is a comparison between two cases: the case where the intersection point between the electrodes 501A and 502B is touched by the user's finger, and the case where the intersection point between the electrodes 501A and 502B is touched by the tip 710 of the electronic pen 120.

FIG. 9A illustrates a case in which the receiver 512 sequentially monitors the electrodes 501B to 596B to monitor the outputs of the electrodes 501B to 596B in a state where the voltage signal 601A is input in the electrode 501A (extracted from FIG. 6).

Figure 9E:
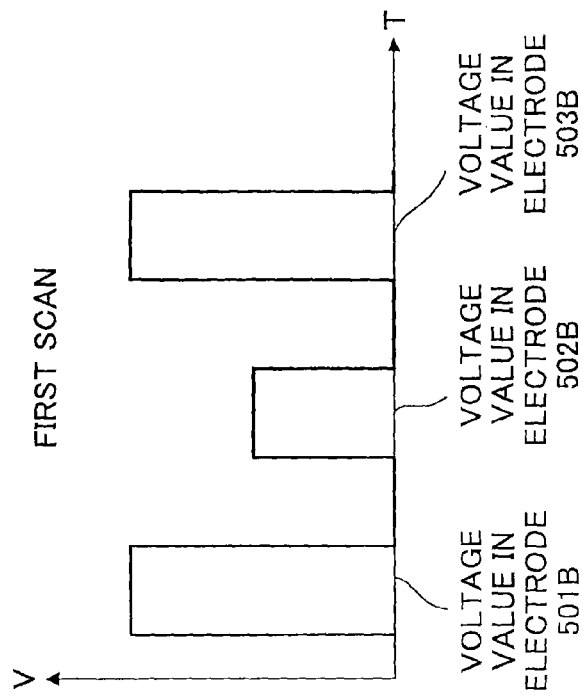
Figure 9D:
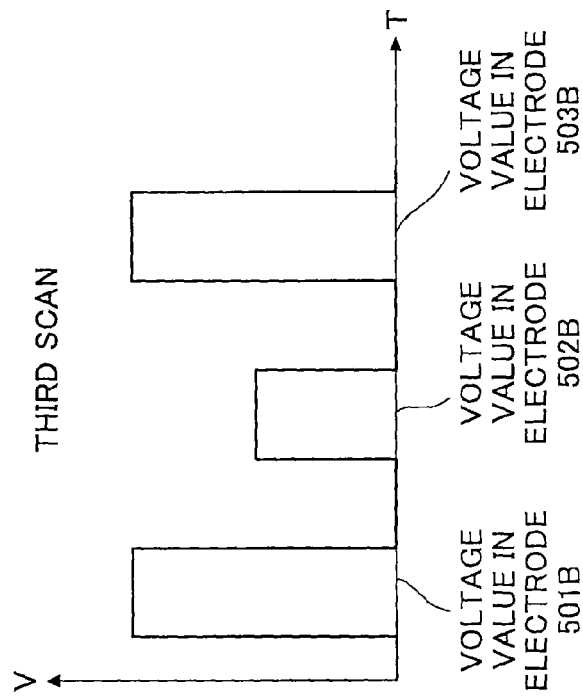

FIGS. 9B to 9D illustrate voltage values detected as a result of the conversion of the current output from the electrodes 501B, 502B, and 503B in the state where the user's finger is in contact with the intersection point between the electrodes 501A and 502B.

FIG. 9B illustrates voltage values obtained by the respective electrodes in the first scan. In FIG. 9B, since the user's finger is in contact with the intersection point between the electrodes 501A and 502B, the voltage value of the electrode 502B is lower than the voltage values of the electrodes 501B and 503B.

FIG. 9C illustrates voltage values obtained by the respective electrodes in the second scan. In FIG. 9C, since the user's finger is in contact with the intersection point between the electrodes 501A and 502B, the voltage value of the electrode 502B is lower than the voltage values of the electrodes 501B and 503B similar to the case of the first scan illustrated in FIG. 9B.

FIG. 9D illustrates voltage values obtained by the respective electrodes in the third scan. In FIG. 9D, since the user's finger is in contact with the intersection point between the electrodes 501A and 502B, the voltage value of the electrode 502B is lower than the voltage values of the electrodes 501B and 503B similar to the case of the second scan illustrated in FIG. 9C.

As illustrated above, in the state where the user's finger is in contact with the intersection point between the electrodes, the voltage value of the intersection point corresponding to the contact position is continuously lowered across the several times of scans. Note that as described above, one scan period is 1 ms. Hence, in terms of one intersection point, even if the user is moving his/her finger, the voltage may be continuously lowered while scanning two or more times.

Figure 9G:
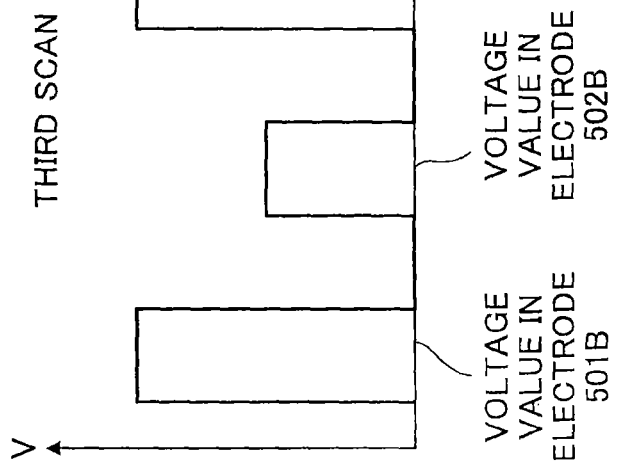
Figure 9F:
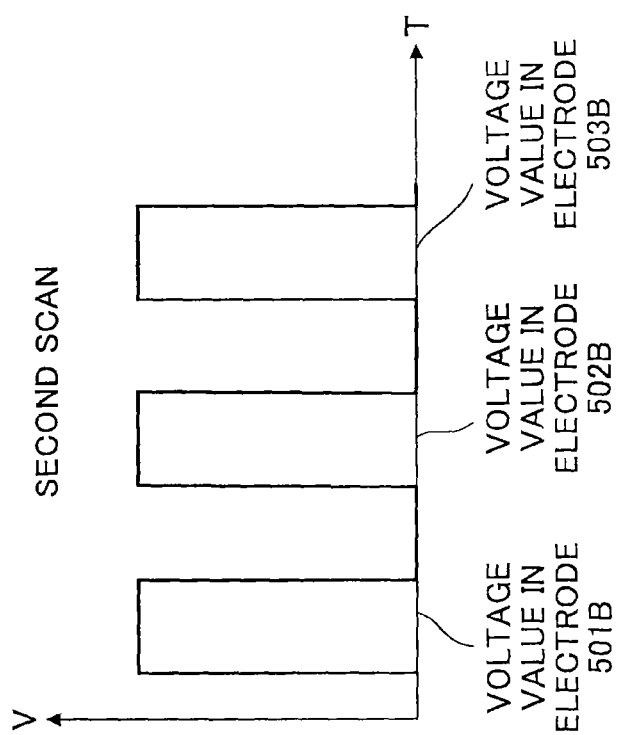

FIGS. 9E to 9G illustrate voltage values detected as a result of the conversion of the current output from the electrodes 501B, 502B, and 503B in the state where the tip 710 of the electronic pen 120 is in contact with the intersection point between the electrodes 501A and 502B.

FIG. 9E illustrates voltage values obtained by the respective electrodes in the first scan. In FIG. 9E, since the tip 710 of the electronic pen 120 is in contact with the intersection point between the electrodes 501A and 502B, the voltage value of the electrode 502B is lower than the voltage values of the electrodes 501B and 503B. Note that in FIG. 9E, the connection switch 706 of the electronic pen 120 is in an on status.

FIG. 9F illustrates voltage values obtained by the respective electrodes in the second scan. In FIG. 9F, the tip 710 of the electronic pen 120 is in contact with the intersection point between the electrodes 501A and 502B. In this second scan, the connection switch 706 of the electronic pen 120 is assumed to be in an off status.

As described above, when the connection switch 706 of the electronic pen 120 is in an off status, the electrostatic capacitance at the intersection point between the electrodes 501A and 502B hardly changes in a state of the tip 710 of the electronic pen 120 being in contact with the intersection point between the electrodes 501A and 502B. Hence, in the second scan, the voltage value of the electrode 502B is equal to the voltage values of other electrodes.

FIG. 9G illustrates voltage values obtained by the respective electrodes in the third scan. In FIG. 9G, since the tip 710 of the electronic pen 120 is in contact with the intersection point between the electrodes 501A and 502B, the voltage value of the electrode 502B is lower than the voltage values of the electrodes 501B and 503B. Note that in FIG. 9G, the connection switch 706 of the electronic pen 120 is in an on status again.

As described above, the voltage value of the intersection point between the electrodes 501A and 502B changes while scanning the electrode part 351 a predetermined number of times in a state of the tip 710 of the electronic pen 120 being in contact with the intersection point between the electrodes 501A and 502B.

That is, the intersection point between the electrodes exhibiting the lowered voltage is monitored while scanning the intersection point a predetermined number of times. Then, when the change of the voltage value of the intersection point is detected, it may be determined that the tip 710 of the electrode pen 120 is in contact with the intersection point. Further, when the predetermined voltage reduction is continued, it may be determined that an object other than the electronic pen 120 (i.e., an object at least differing from the electronic pen 120) is in contact with the intersection point.

Determination Process Performed by a Determination Part

Figure 10:
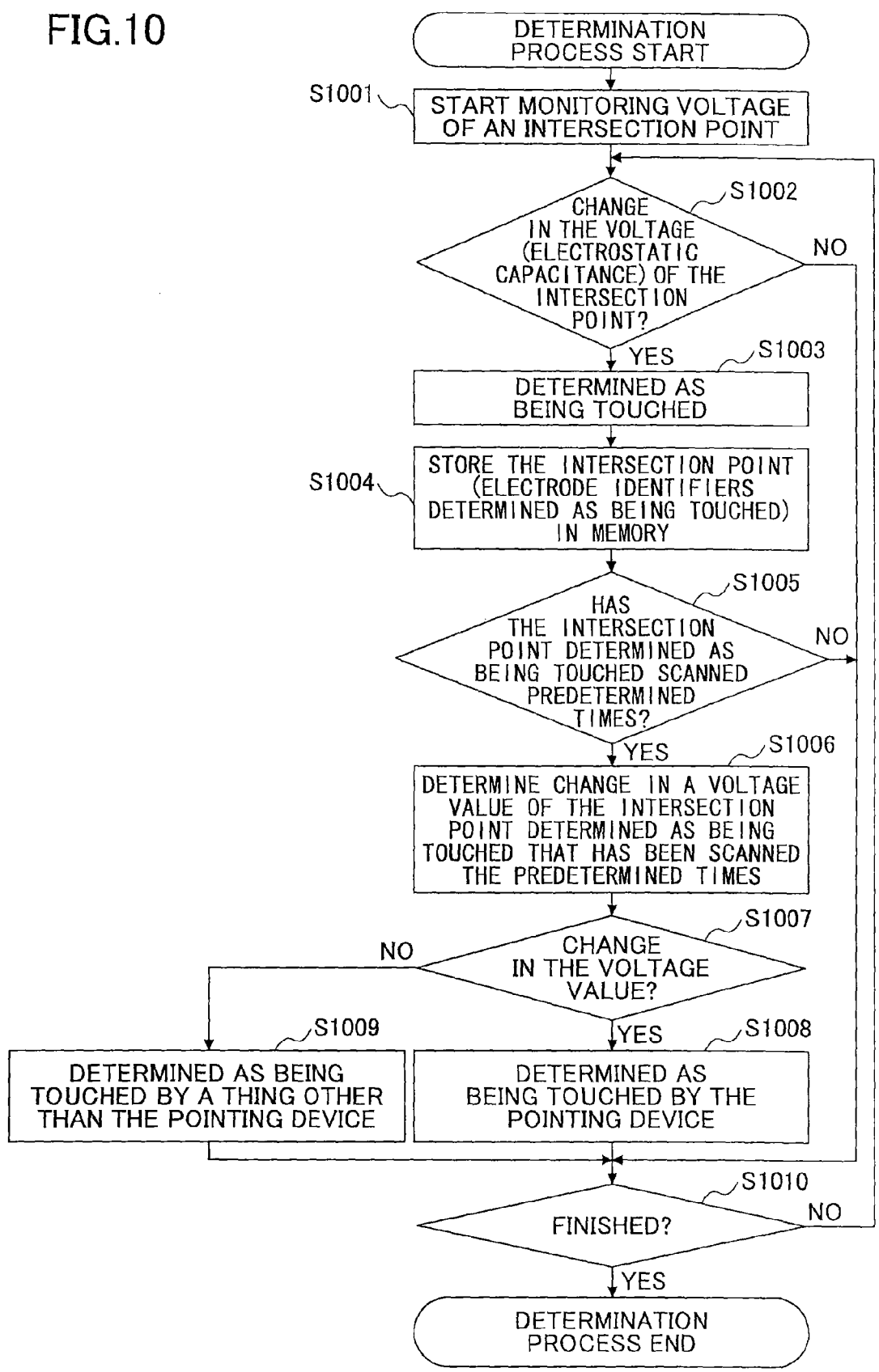
FIG. 10 is a flowchart illustrating a determination process performed by a determination part forming the detector.

Next, an illustration is given of a determination process performed by a determination part 513. FIG. 10 is a flowchart illustration the determination process for determining whether the electrode pen 120 or an object other than the electronic pen 120 is touched (in contact) based on the voltage value of each of the electrodes output from the receiver 512.

The determination process illustrated in FIG. 10 starts based on a start instruction from the input-output controller 515. In step S1001, monitoring of the voltage of each intersection point starts. Specifically, the voltage values of the respective intersection points are sequentially output from the receiver 512, and the termination part 513 starts monitoring each of the output voltage values sequentially.

In step S1002, the determination part 513 determines whether a target voltage value of the voltage values sequentially output from the receiver 512 is a predetermined threshold or less. When the determination part 513 determines that the target voltage value is not the predetermined threshold or less, the determination part 513 determines that nothing has touched the intersection point at which the target voltage is obtained. Then, when there is no ending instruction in step S1010, a subsequent step is processed.

On the other hand, in step 1002, when the determination part 513 determines that the target voltage value is the predetermined threshold or less, the determination part 513 determines that there is a contact object that has touched the intersection point exhibiting the target voltage value in step S1003.

Further, in step S1004, when the determination part 513 determines that there is the contact object that has touched the intersection point, the intersection point is stored in memory. Specifically, the identifier of the electrode of the first electrode group forming the intersection point and the identifier of the electrode of the second electrode group forming the intersection point are stored in memory.

In step S1005, the determination part 513 determines whether the intersection point which the contact object has touched is scanned a predetermined number of times. When the intersection point has not been scanned the predetermined number of times, and there is no ending instruction in step S1010, the determination part 513 is in a standby mode until the intersection point has been scanned the predetermined number of times. Note that when the determination part 513 determines that there is a contact object on another intersection point in the standby mode, the determination part 513 is in the standby mode until another intersection point has been scanned.

When the determination part 513 determines that the intersection point which the contact object has touched is scanned the predetermined number of times in step S1003, step S1006 is processed. In step S1006, the determination part 513 determines that whether there is a change of the voltage value of the intersection point which the contact object has touched. Specifically, the determination part 513 calculates the difference between the voltage value of the intersection point in the previous scan and the voltage value of the intersection point in the current scan, and determines whether the difference is a predetermined threshold or more so as to determine whether there is a change of the voltage value of the intersection point.

As a result of the determination in step S1006, when the determination part 513 determines that there is a change of the voltage value of the intersection point while scanning the intersection point the predetermined number of times, the determination part 513 moves from step S1007 to step S1008 to determine that the contact object is the tip 710 of the electronic pen 120.

On the other hand, when the determination part 513 determines that there is no change of the voltage value of the intersection point while scanning the intersection point the predetermined number of times, the determination part 513 moves from step S1007 to step S1009. Then, the determination part 513 determines that the contact object is a contact object other than the electronic pen 120 (at least an object differing from the electronic pen 120).

The determination part 513 moves to step S1010 after finishing the determination in step S1008 or S1009, and determines whether the ending instruction is received (transmitted) from the input-output controller 515. When the determination part 513 has not received the ending instruction from the input-output controller 515, the determination part 513 moves back to step S1002 to continue to perform the determination process.

On the other hand, when the determination part 513 has received the ending instruction from the input-output controller 515 in step S1010, the determination part 513 ends the determination process.

Outline

As described above, the coordinates input system 100 according to the first embodiment is:

configured to include the input-output part 205 composed of the electrode part 351 and the detector 352 configured to provide the electronic pen 120 with the connection switch 706 to switch the conductivity between the tip 710 and the gripper 701 of the electronic pen configured to control of/off of the connection switch 706 of the electronic pen 120 at a switching period n times longer than the scan period of the electrode part 351 configured to provide the determination part 513 with the detector 352 to monitor the voltage values of the intersection points received from the receiver 512, and monitor the intersection point, when detecting the voltage value of the intersection point is lowered, during n times of scanning configured to determine that the contact object is other than the electronic pen 120 (at least an object differing from the electronic pen 120) that is in contact when the predetermined voltage reduction continues the during n times of scanning as a result of monitoring the voltage value of the intersection point during n times of scanning configured to determine that the contact object is the electronic pen 120 that is in contact when the voltage value of the intersection point changes during n times of scanning As described above, the voltage value of each of the intersection points detected by the receiver 512 may be changed by forming in the electronic pen 120 the connection switch 706 configured to be turned on or off at the predetermined switching period. Accordingly, it may be possible to simply identify whether the intersection points are touched by the electronic pen 120 or an object (at least differing from the electronic pen 120) other than the electronic pen 120.

In addition, wiring connections between the electronic pen 120 and the electronic information board 110 or communication processes between the electronic pen 120 and the electronic information board 110 may be omitted from the coordinates input system 100 having the above-described configuration. Hence, the simplified structure of the electronic pen 120 may be maintained to have advantages such as downsizing and lightening, and a lowered failure frequency of the electronic pen 120.

Second Embodiment

In the above-described first embodiment, the switching period of the connection switch 706 of the electronic pen 120 is set at n times longer than the scan period of the electrode part 351, and the examples of n=2 and n=3 applied are described. However, the invention is not limited to this example of the first embodiment.

Theoretically, n may be any numerical value insofar as the switching period of the connection switch 706 of the electronic pen 120 is at least twice the scan period of the electrode part 351 to identify the difference between the contact by the electronic pen 120 and the contact by any other objects apart from the electronic pen 120.

Further, the longer the switching period of the connection switch 706 of the electronic pen 120, the higher the accuracy in the identification of the difference between the contact by the electronic pen 120 and the contact by any other objects apart from the electronic pen 120 may be.

However, when the switching period of the connection switch 706 of the electronic pen 120 is too long, it may take more time to identify the difference between the contact by the electronic pen 120 and the contact by any other objects apart from the electronic pen 120. For example, when a user inputs handwriting characters and the like with the electronic pen 120, display of the characters or the like on the input-output surface 111 may be increasingly delayed from the input made by the user.

In general, a delay time from the user's inputting handwritten characters or the like to displaying the input characters or the like on the input-output surface 111 may preferably be 10 ms or less. Hence, it may be preferable that the switching period of the connection switch 706 of the electronic pen 120 be 10 ms or less. Note that when the switching period of the connection switch 706 is 10 ms or less, and the scan period of the electrode part 351 is 1 ms, the difference between the contact by the electronic pen 120 and the contact by any other objects apart from the electronic pen 120 may be identified by performing scanning of the electrode part 351 ten times.

In addition, the switching period of the connection switch 706 of the electronic pen 120 may need to consider an operating rate of the user. In general, the operating rate may be approximately 2 ms, and a time consumed for monitoring a voltage change in each of the intersection points may be approximately 5 ms.

Accordingly, it may be preferable that the switching period of the connection switch 706 of the electronic pen 120 be two to five times the scan period of the electrode part 351.

Note that the first and second embodiments describe that on time and off time of the connection switch 706 of the electronic pen 120 have equal duration within the switching period. However, the first and second embodiments are not limited to these examples. Hence, on time and off time of the connection switch 706 of the electronic pen 120 may have different durations. Note that in such a case, either of on time and off time may need to be set longer than the scan period.

Third Embodiment

The above first embodiment describes that the determination part 513 is configured to regularly identify the difference between the contact by the electronic pen 120 and the contact by any other objects apart from the electronic pen 120. However, the invention is not limited to this example of the first embodiment.

For example, the electronic information board may include a mode to identify the difference between the contact by the electronic pen 120 and the contact by any other objects apart from the electronic pen 120 to only receive the contact by the electronic pen 120 as an input, and a mode to receive both the contact by the electronic pen 120 and the contact by any other objects apart from the electronic pen 120 as an input without identifying the difference, so that the user may select one of these two modes.

Further, the first embodiment describes that the coordinates of the tip 710 of the electronic pen 120 calculated by the coordinates calculator 331 are used for generating a drawing image. However, the invention is not limited to this example of the first embodiment. For example, the coordinates of the tip 710 of the electronic pen 120 calculated by the coordinates calculator 331 may be used in a selecting process of selecting an image such as an icon displayed on the input-output surface 111, or may be used in a deleting process of deleting an image displayed on the input-output surface 111.

Fourth Embodiment

The first embodiment describes that the electronic pen 120 includes the power supply switch 702, so that on/off of the connection switch 706 is repeatedly controlled in a state of the power supply switch 702 being turned on. However, the invention is not limited to this example of the first embodiment.

For example, the tip 710 of the electronic pen 120 is movably configured and is provided with a detecting circuit configured to detect sliding of the tip 710 when the tip 710 touches the input-output surface 111. Hence, on/off of the connection switch 706 may be repeatedly controlled while the detecting circuit detects the sliding of the tip 710. In such a configuration, power for controlling on/off control of the connection switch 706 may only be supplied while the user inputs data by handwriting, and hence the consumption of the battery 703 energy may be suppressed.

Alternatively, a detecting circuit configured to detect a voltage generated when the tip 710 of the electronic pen 120 touches the input-output surface 111 may be provided. Hence, on/off of the connection switch 706 may be repeatedly controlled while the detecting circuit detects the generated voltage. In such a configuration, power for controlling on/off control of the connection switch 706 may only be supplied while the user inputs data by handwriting, and hence the consumption of the battery 703 energy may be suppressed. Further, this configuration does not include a movable part, and hence, a failure frequency may be lowered.

Fifth Embodiment

The above-described first embodiment describes that the conductivity between the tip 710 and the gripper 701 of the electronic pen 120 is switched by controlling on/off of the connection switch 706. However, the invention is not limited to this example of the first embodiment.

For example, two circuits having different resistances may be provided between the tip 710 and the gripper 701, and the conductivity between the tip 710 and the gripper 701 of the electronic pen 120 may be switched by switching the connection between the two circuits.

In this configuration, the voltage value may still be changed as illustrated in FIGS. 9E to 9G by switching the connection switch 706.

Sixth Embodiment

The first embodiment describes a projected mutual capacitance detection method as a method of detecting electrostatic capacitance of coordinates. However, the invention is not limited to this example of the first embodiment. For example, a projective self-capacitance method may be applied as the method of detecting electrostatic capacitance of coordinates. Alternatively, a surface-capacitance method may be applied as the method of detecting electrostatic capacitance of coordinates.

Note that the projected mutual capacitance detection method may have an advantage of simultaneously using two or more electronic pens. In this case, each of the electronic pens may have the connection switch 706 having a different switching period.

In this configuration, since each of the electronic pens include different switching periods, the number of changes in the voltage value may vary while scanning is performed a predetermined number of times. As a result, the determination part 513 may be able not only to identify the difference between the electronic pen and an object other than the electronic pen, but may also be able to identify types of the electronic pens.

Seventh Embodiment

The above-described embodiments describe cases where one type of the electronic pen 120 is used. However, two or more types of the electronic pans may be used in the coordinates input system 100.

Further, the above-described embodiments describe a handwriting input function to draw the contact positions when the tip 710 of the electronic pen 120 touches the coordinates input system 111. However, a function implemented by the coordinates input system 100 is not limited to the handwriting input function. For example, the coordinates input system 100 may implement an eraser function to erase drawing content drawn on the contact positions when the tip of the electronic pen 120 touches the input-output surface 111.

In the coordinates input system 100, when two or more electronic pens 120 are used or when each of the electronic pens 120 is provided with two or more functions, it may be necessary that the types or executed functions of the currently used electronic pens 120 are identifiable in the electronic information board 110.

Hence, in the coordinates input system 100 according to an embodiment, the electronic pen is provided with an emitting function such that the types or executed functions of the currently used electronic pens 120 may be identified by causing the electronic information board to identify a lighting status of the electronic pen. In the following, a detailed description is given of the coordinates input system 100 according to such an embodiment.

Hardware Configuration of Electronic Information Board

Figure 11:
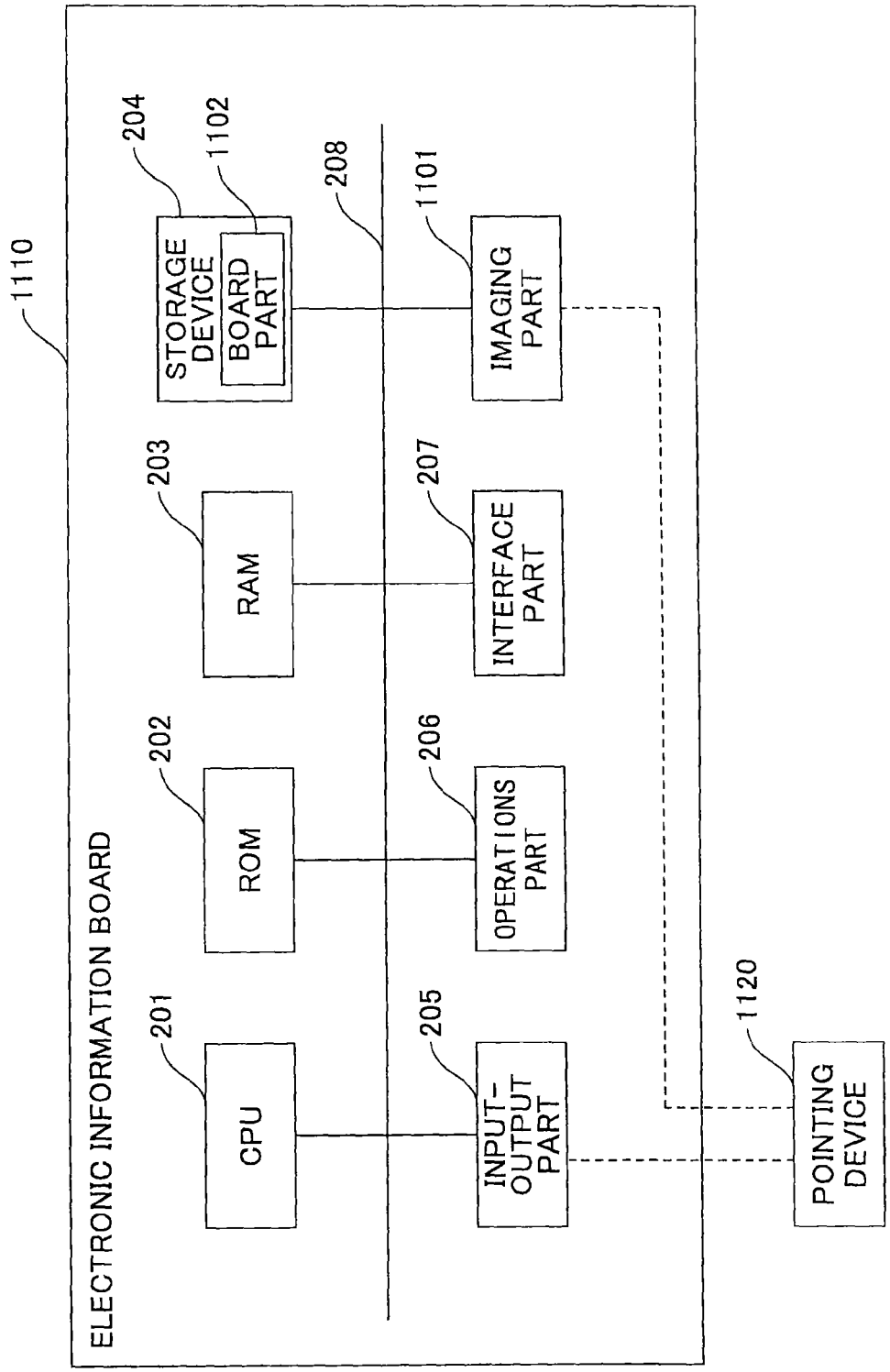
FIG. 11 is a diagram illustrating another example of a hardware configuration of the electronic information board.

Initially, a description is given of a hardware configuration of an electronic information board 1110 of a coordinates input system according to the embodiment. FIG. 11 is a diagram illustrating the hardware configuration of the electronic information board 1110. Note that components of the hardware configuration of the electronic information board 1110 illustrated in FIG. 11 that are identical to those of the hardware configuration of the electronic information board 110 illustrated in FIG. 2 are provided with the same reference numbers, and duplicated illustrations are omitted.

The hardware configuration of the electronic information board 1110 illustrated in FIG. 11 differs from that of the electronic information board 110 in FIG. 2 in that the electronic information board 1110 includes an imaging part 1101. The imaging part 1101 is configured to image a pointing device (an electronic pen 1120) having a tip that is in contact with the input-output surface 111. The captured image obtained by the imaging part 1101 is analyzed by a board part 1102 to identify a lighting status (a light on or off status) of the electronic pen 1120 having the emitting function.

Configuration and Operations of Electronic Pen

Figure 12:
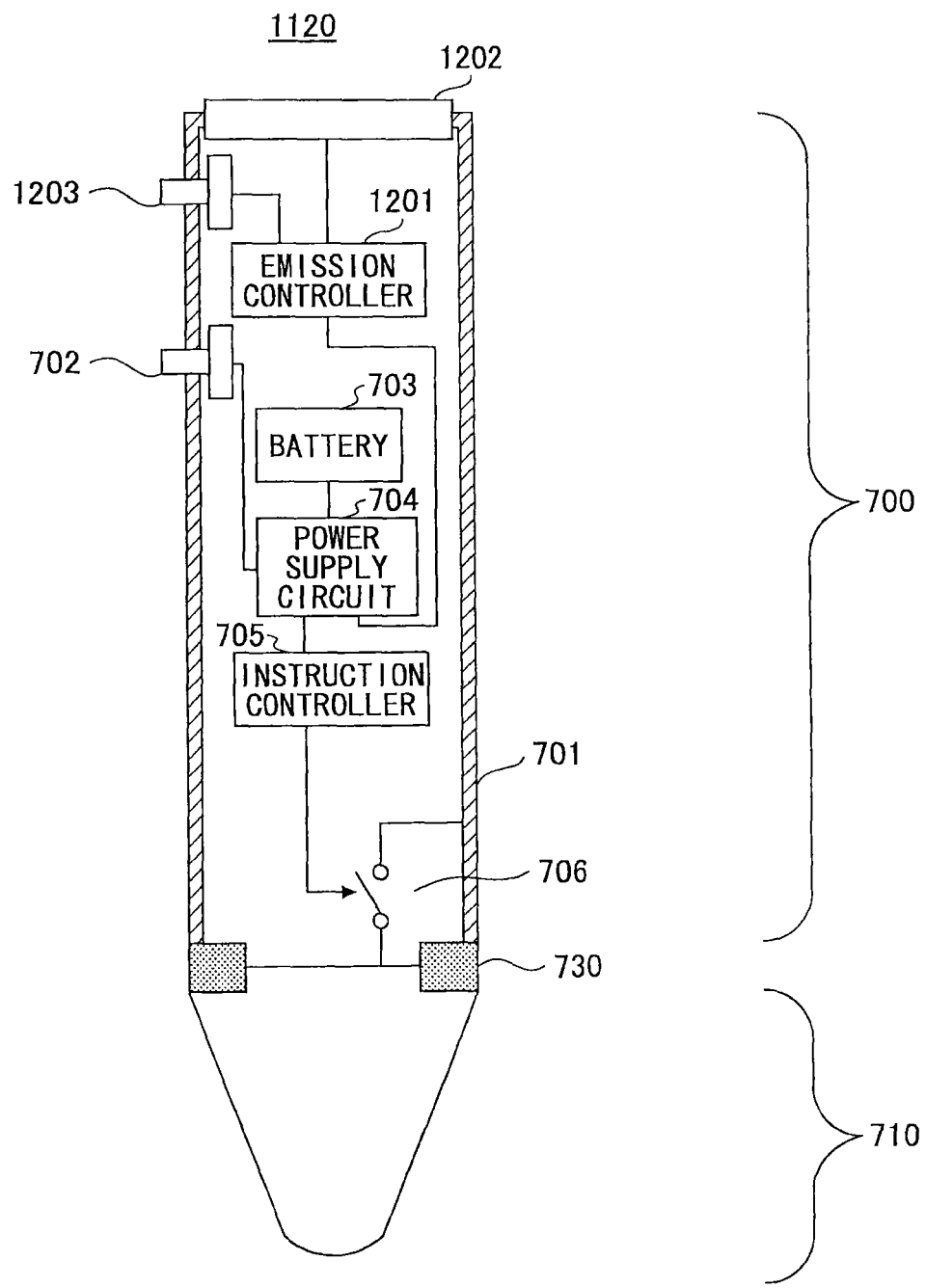
FIG. 12 is a diagram illustrating a configuration and operations of an electronic pen.

Next, an illustration is given of a configuration and operations of the electronic pen 1120. FIG. 12 is a diagram illustrating the configuration and the operations of the electronic pen 1120. Note that components of the electronic pen 1120 illustrated in FIG. 12 that are identical to those of the electronic pen 120 illustrated in FIGS. 7A and 7B are provided with the same reference numbers, and duplicated illustrations are omitted.

The electronic pen 1120 illustrated in FIG. 12 differs from the electronic pen 120 illustrated in FIGS. 7A and 7B in that the electronic pen 1120 includes a emission controller 1201, an emitter (e.g., a light-emitting diode) 1202, and a function selection button 1203. The emission controller 1201 supplied with electric power from the power supply circuit 704 controls a lighting status of the emitter 1202. The emission controller 1201 controls the lighting status of the emitter 1202 based on a type of the electronic pen 1120, and a selected result of the function selection button 1203.

The emitter 1202 repeats turning light on and off in accordance with the control of the emission controller 1201. The function selection button 1203 is configured to switch between a handwriting input function configured to draw contact positions when the tip of the electronic pen 1120 touches the contact positions, and an eraser function configured to erase the drawing content drawn in the contact positions touched by the tip of the electronic pen 1120. The selected content of the function selection button 1203 is reported to the emission controller 1201.

FIG. 13 is a diagram illustrating a list of contents of a lighting status of the emitter 1202 controlled by the emission controller 1201. As illustrated in FIG. 13, in the coordinates input system 100 according to the embodiment, four types of lighting statuses are defined based on types and functions of the electronic pen 1120.

Specifically, there are three types of the electronic pen 1120 including a handwriting-specific electronic pen, an electronic pen having a pen tip 1, and an electronic pen having a pen tip 2, and a common lighting status is defined in the eraser functions of the respective electronic pens.

Figure 14A:
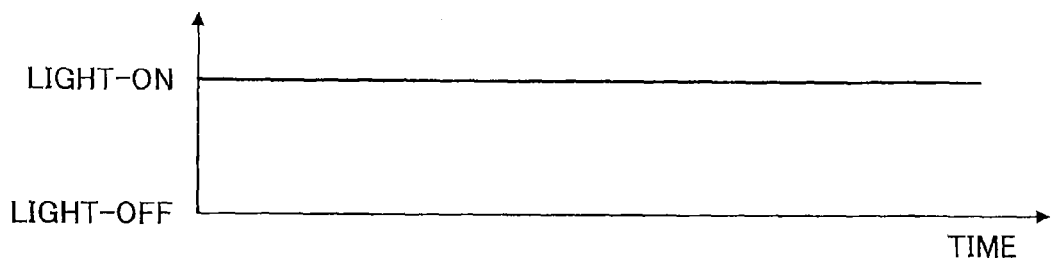
FIGS. 14A to 14D are diagrams illustrating examples of the lighting status of the emitter.

For example, in the handwriting-specific electronic pen, a ratio of a light-on time to a light-off time is 1:0. That is, the emitter 1202 is constantly turned on while the handwriting input function is selected in the handwriting-specific electronic pen. FIG. 14A is a diagram illustrating a lighting status in a state where the handwriting input function is selected in the handwriting-specific pen. As illustrated in FIG. 14A, the emitter 1202 is continuously turned on while the power is supplied to the emission controller 1201.

Figure 14B:
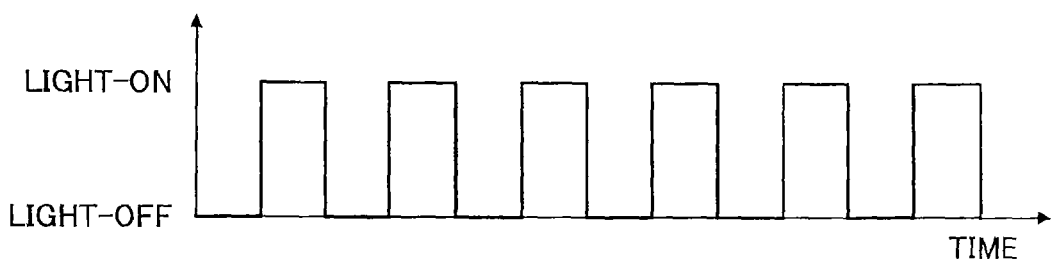

On the other hand, as illustrated in FIG. 13, when the eraser function is selected in the handwriting-specific pen, a ratio of the light-on time to the light-off time is 1:1. FIG. 14B is a diagram illustrating a lighting status in a state where the eraser function of the handwriting-specific pen is selected. As illustrated in FIG. 14B, the emitter 1202 repeats turning light-on and light-off statuses at the same time period (i.e., time period of one to one (1:1)) while the power is supplied to the emission controller 1201.

Figure 14C:
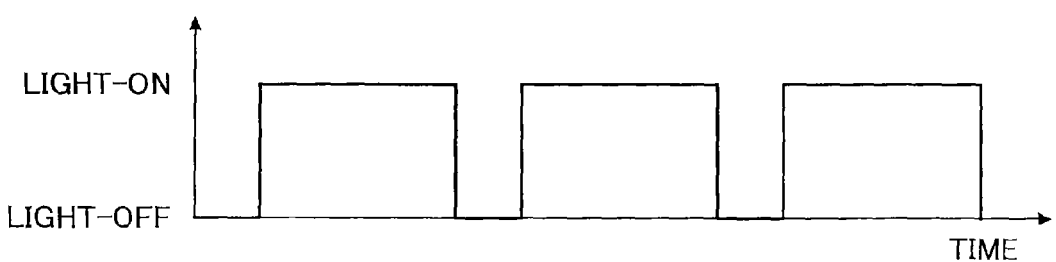

Further, as illustrated in FIG. 13, the electronic pen 1120 with the pen tip 1 has a ratio of the light-on time to the light-off time that is 3:1. FIG. 14C is a diagram illustrating a lighting status in a state where the handwriting input function of the electronic pen 1120 with the pen tip 1 is selected. As illustrated in FIG. 14C, the emitter 1202 repeats turning light-on and light-off statuses at the time period of three to one (3:1) while the power is supplied to the emission controller 1201.

Note that when the eraser function is selected in the electronic pen 1120 with the tip 1, a ratio of the light-on time to the light-off time is also 1:1. That is, as illustrated in FIG. 14B, the emitter 1202 repeats turning light-on and light-off statuses at the same time period while the power is supplied to the emission controller 1201.

Figure 14D:
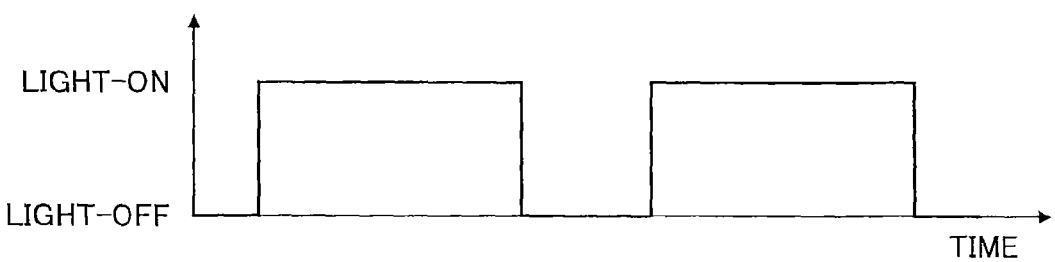

Further, as illustrated in FIG. 13, in the electronic pen 1120 with the pen tip 2, a ratio of the light-on time to the light-off time is 4:2. FIG. 14D is a diagram illustrating a lighting status in a state where the handwriting input function is selected in the electronic pen 1120 with the pen tip 2. As illustrated in FIG. 14D, the emitter 1202 repeats turning light-on and light-off statuses at the time period of four to one (4:2) while the power is supplied to the emission controller 1201.

Note that when the eraser function is selected in the electronic pen 1120 with the pen tip 2, a ratio of the light-on time to the light-off time is also 1:1. That is, as illustrated in FIG. 14B, the emitter 1202 repeats turning light-on and light-off statuses at the same time period while the power is supplied to the emission controller 1201.

Note that the illustration is given of the example employing three types of the electronic pens 1120 with reference to FIG. 12 to FIG. 14D. However, the invention is not limited to this example. There may be four or more types of the electronic pens 1120. Further, in the illustration with reference to FIG. 12 to FIG. 14D, the lighting modes are the same when the eraser function of the electronic pen 1120 is selected regardless of the types of the electronic pens 1120. However, the lighting modes pen 1120 may be configured to be different based on the selected types of the electronic pens 1120 when the eraser function of the electronic pen 1120 is selected.

In addition, in the illustration with reference to FIG. 12 to FIG. 14D, the ratio of the light-on time to the light-off time is defined in each of four types of lighting modes. However, the light-on time and the light-off time themselves may be configured to be defined in each of four lighting modes. Note that the light-on time and the light-off time of the emitter 1202 are assumed to be set longer than an imaging period for one frame of the imaging part 1101. This is because it may be difficult to identify the four types of lighting modes when the light-on time and the light-off time of the emitter 1202 are shorter than the imaging period for one frame of the imaging part 1101.

Functional Configuration of Electronic Information Board

Figure 15:
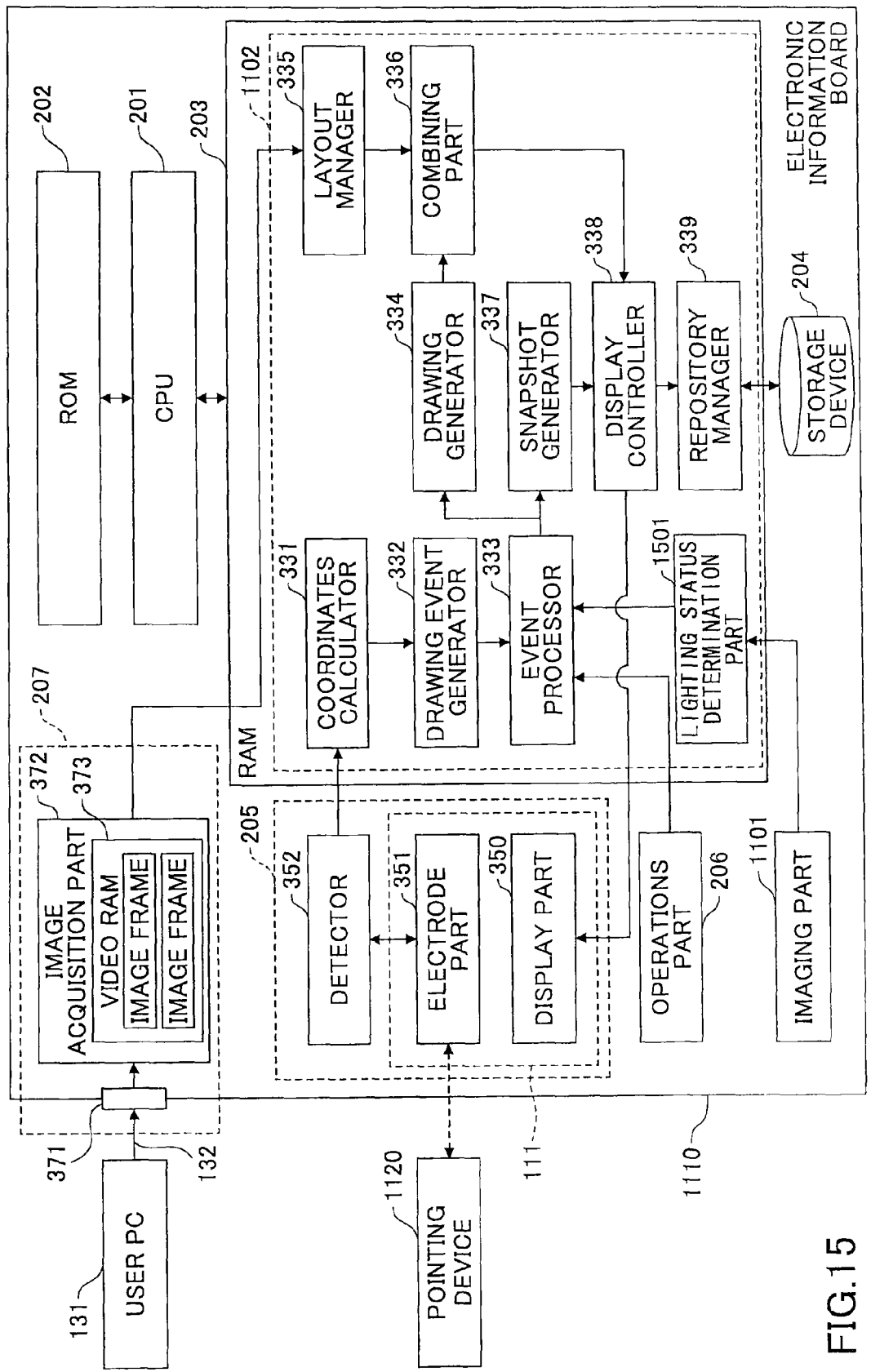
FIG. 15 is a diagram illustrating another example of a functional configuration of the electronic information board.

Next, a description is given of a functional configuration of an electronic information board 1110. FIG. 15 is a diagram illustrating another functional configuration of the electronic information board 1110. Note that components of the functional configuration of the electronic information board 1110 illustrated in FIG. 15 that are identical to those of the functional configuration of the electronic information board 110 illustrated in FIG. 3 are provided with the same reference numbers, and duplicated illustrations are omitted.

The functional configuration of the electronic information board 1110 illustrated in FIG. 15 differs from that of the electronic information board 110 in FIG. 3 in that the electronic information board 1110 includes a lighting status determination part 1501. The lighting status determination part 1501 identifies the lighting status of the emitter 1202 in each of the frames of the captured images received in the past every time the captured image for one frame is transmitted from the imaging part 1101. The lighting status determination part 1501 counts the number of frames of which the emitter 1202 is identified as the light-on status and the number of frames of which the emitter 1202 is identified as the light-off status, among the captured images for the frames received in the past. Hence, the lighting status determination part 1501 may be able to detect a ratio of the light-on time to the light-off time of the emitter 1202. Further, the lighting status determination part 1501 identifies a type of the electronic pen 1120 as well as identifying whether the handwriting function or the eraser function is selected, based on the ratio of the light-on time to the light-off time of the emitter 1202. In addition, the lighting status determination part 1501 transmits a report of identification results (determination results) to the event processor 333.

Hence, in the electronic information board 1110, the type and the selected function of the electronic pen 1120 used are identified, and a report of the identified results is transmitted to the event processor 333 every time the captured image for one frame is transmitted from the imaging part 1101.

Figure 16:
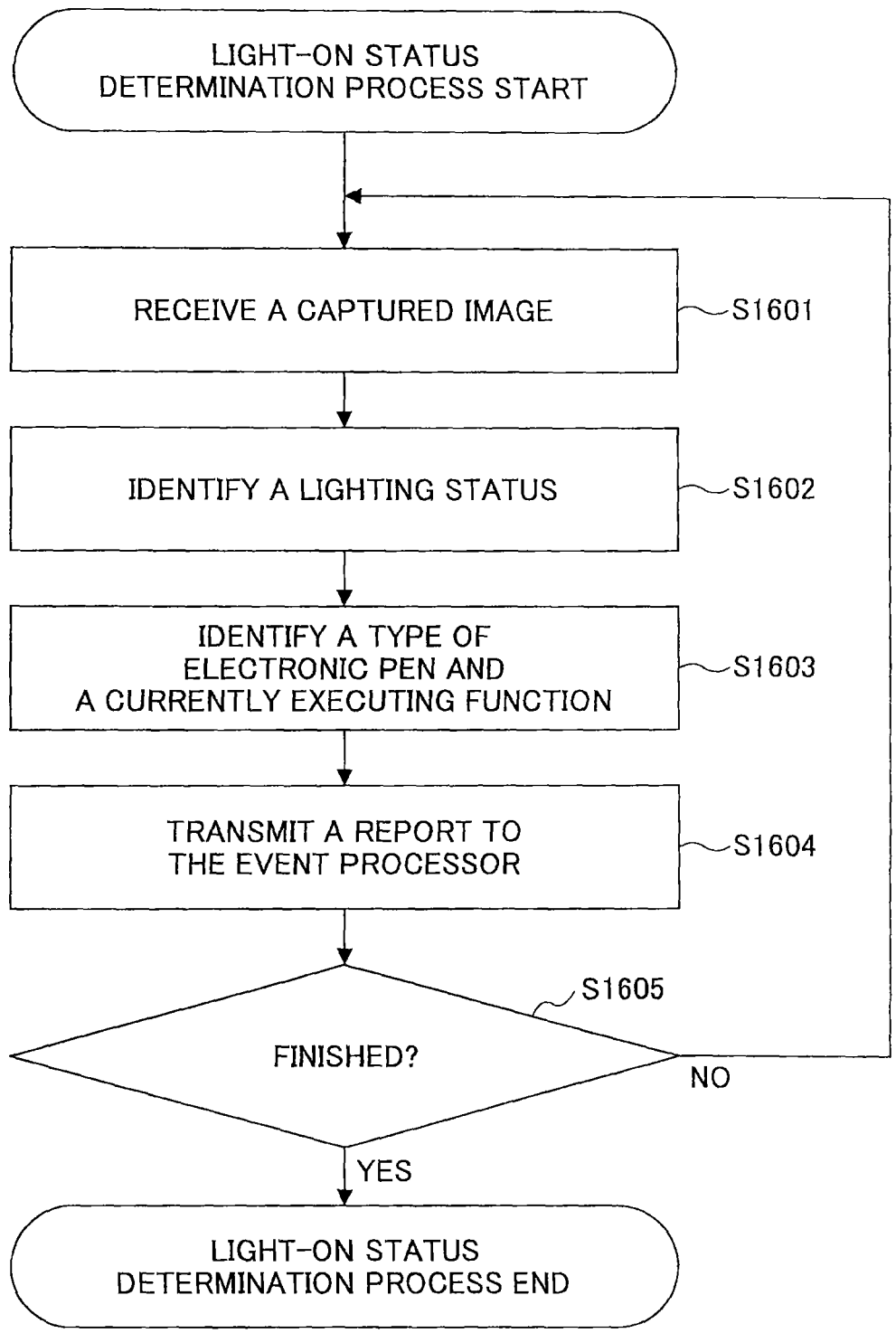
FIG. 16 is a flowchart illustrating an example of a lighting status determination process.

Lighting Status Determination Process Performed by Lighting Status Determination Part Next, a lighting status determination process performed by the lighting status determination part 1501 is illustrated. FIG. 16 is a flowchart illustrating a lighting status determination process performed by the lighting status determination part 1501.

In step S1601, the lighting status determination part 1501 receives a captured image for one frame from the imaging part 1101, and identifies a lighting status of the electronic pen 1120 by analyzing the received captured image.

In step S1602, the lighting status determination part 1501 calculates the number of frames of which the emitter 1202 is identified as the light-on status and the number of frames of which the emitter 1202 is identified as the light-off status, among the captured images for the frames received in the past including the captured image received in step S1601. Further, the lighting status determination part 1501 also calculates a ratio of the number of frames identified as the light-on status to the number of frames is identified as the light-off status (i.e., a ratio of the light-on time to the light-off time of the emitter 1202).

In step S1603, the lighting status determination part 1501 identifies the type of the electronic pen 1120 based on the ratio of the light-on time to the light-off time calculated in step S1602. Further, the lighting status determination part 1501 also identifies whether the handwriting function or the eraser function is selected based on the ratio of the light-on time to the light-off time calculated in step S1602.

In step S1604, the lighting status determination part 1501 transmits a report of the determination results in step S1603 to the event processor 333. In step S1605, the lighting status determination part 1501 determines whether an ending instruction is input, and when the lighting status determination part 1501 determines that the ending instruction is not input in step S1605, the lighting status determination part 1501 returns to a process in step S1601. On the other hand, when the lighting status determination part 1501 determines that the ending instruction is input in step S1605, the lighting status determination part 1501 ends the lighting status determination process.

As described above, the coordinates input system 100 according to the embodiment includes the electronic pen 1120 provided with the emitter 1202 configured to emit light based on the type and the currently executed function of the electronic pen, and the electronic information board 1110 configured to identify the lighting status of the electronic pen.

In the coordinates input system 100 according to the embodiment having such a configuration, the types of the currently used electronic pen 1120 or the currently executed function of the electronic pen 1120 may be identified by the electronic information board 1110. In addition, a structure of the coordinates input system 100 according to the embodiment may be simplified because no communication functions are required.

Eighth Embodiment

In the seventh embodiment, the imaging part 1101 is provided, and the lighting status of the electronic pen 1120 is identified by analyzing the captured image. However, the invention is not limited to this example of the seventh embodiment. For example, a phototransistor is provided, and lighting status of the electronic pen 1120 is identified by phototransistor. For example, when the lighting status is identified by the phototransistor at a 10 ms period, the phototransistor may be able to identify the lighting status ten times in 10 ms.

Further, in the above seventh embodiment, the handwriting input function and the eraser function are identified as the functions of the electronic pen 1120. However, the invention is not limited to this example of the seventh embodiment. Other functions of the electronic pan 1120 may also be identified.

Moreover, in the above-described seventh embodiment, the emitter 1202 is controlled while the power is supplied to the emission controller 1201. However, the invention is not limited to this example of the seventh embodiment. For example, the tip of the electronic pen 1120 may be provided with a mechanical switch configured to detect the contact on the input-output surface 111, and the emitter 1202 may be controlled while the mechanical switch detects the contact on the input-output surface 111.

According to each of the above-described embodiments, it may be possible to identify the input that is made by the pointing device in the coordinates input system 100 employing the electrostatic capacitance type.

Note that the present invention is not limited to the specifically disclosed the above-described embodiments or combinations of the embodiments. Variations and modifications may be made without departing from the scope of the present invention, and may be defined in a variety of applications.

The present invention is not limited to the specifically disclosed embodiments, and variations and modifications may be made without departing from the scope of the present invention.

The present application is based on and claims the benefit of priority of Japanese Priority Application No. 2014-130948 filed on Jun. 26, 2014, the entire contents of which are hereby incorporated herein by reference.

What is claimed is:

1. A coordinates input system comprising:
   a coordinates input apparatus; and
   a pointing device, wherein
   the coordinates input apparatus includes
      a detector configured to detect a voltage value of each of intersection points between electrodes arranged in an electrode part, and
      a determination part configured to determine whether coordinates are input into the electrode part by the pointing device based on the voltage value detected by the detector, wherein
   the pointing device includes
      a switching part configured to switch conductivity between a contact part configured to be in contact with the electrode part and a gripper held by a user, and
      a controller configured to switch the conductivity between the contact part and the gripper at a switching period longer than a detection period in the detector of the coordinates input apparatus, and wherein
   the determination part of the coordinates input apparatus determines whether the coordinates input into the electrode part are made by the pointing device based on a change in each of the voltage values of the intersection points within a time corresponding to the switching period.

2. The coordinates input system as claimed in claim 1, wherein
   the determination part of the coordinates input apparatus
      identifies an intersection point corresponding to a voltage value when the voltage value detected by the detector of the coordinates input apparatus is lowered,
      monitors the voltage value of the identified intersection point over a time corresponding to the switching period, and
      determines that the coordinates are input by the pointing device when the change in the voltage value of the identified intersection point is determined as a monitoring result.

3. The coordinates input system as claimed in claim 2, wherein
   the determination part of the coordinates input apparatus determines that the coordinates are input by an object differing from the pointing device when the voltage value of the identified intersection point is continuously lowered as a monitoring result.

4. The coordinates input system as claimed in claim 1, wherein
   the switching period is n times (n is a value of 2 or more) longer than the detection period in the detector of the coordinates input apparatus.

5. A coordinates input apparatus to which coordinates are input by a pointing device having conductivity switched at a predetermined switching period,
   the coordinates input apparatus comprising:
   a detector configured to detect a voltage value of each of intersection points between electrodes arranged in an electrode part; and
   a determination part configured to determine whether coordinates are input into the electrode part by the pointing device based on the voltage value detected by the detector, wherein
   the determination part determines whether the coordinates input into the electrode part are made by the pointing device based on a change in each of the voltage values of the intersection points within a time corresponding to the predetermined switching period longer than a detection period in the detector.

6. The coordinates input apparatus as claimed in claim 5, wherein
   the determination part identifies an intersection point corresponding to a voltage value when the voltage value detected by the detector is lowered, monitors the voltage value of the identified intersection point over a time corresponding to the switching period, and determines that the coordinates are input by the pointing device when the change in the voltage value of the identified intersection point is determined as a monitoring result.

7. The coordinates input apparatus as claimed in claim 6, wherein the determination part determines that the coordinates are input by an object differing from the pointing device when the voltage value of the identified intersection point is continuously lowered as a monitoring result.

8. The coordinates input apparatus as claimed in claim 5, wherein the switching period is n times (n is a value of 2 or more) longer than the detection period in the detector.

9. A method of inputting coordinates in a coordinates input system having a coordinates input apparatus, and a pointing device, the method comprising steps of:

detecting, by the coordinates input apparatus, a voltage value of each of intersection points between electrodes arranged in an electrode part;

determining, by the coordinates input apparatus, whether coordinates are input into the electrode part by the pointing device based on the voltage value detected in the detecting step; and causing the pointing device to control a switching part to switch conductivity between a contact part configured to be in contact with the electrode part and a gripper held by a user at a switching period longer than a detection period in the detecting step executed in the coordinates input apparatus, wherein the determining step in the coordinates input apparatus is performed based on a change in each of the voltage values of the intersection points within a time corresponding to the switching period.

10. The method as claimed in claim 9, wherein the determining step in the coordinates input apparatus includes identifying an intersection point corresponding to a voltage value when the voltage value detected in the detecting step in the coordinates input apparatus is lowered;

monitoring the voltage value of the identified intersection point over a time corresponding to the switching period; and determining that the coordinates are input by the pointing device when the change in the voltage value of the identified intersection point is determined as a monitoring result.

11. The method as claimed in claim 10, wherein the determining step in the coordinates input apparatus includes determining that the coordinates are input by an object differing from the pointing device when the voltage value of the identified intersection point is continuously lowered as a monitoring result.

12. The method as claimed in claim 9, wherein the switching period is n times (n is a value of 2 or more) longer than the detection period in the detecting step in the coordinates input apparatus.

* * * * *